(12) United States Patent
Alshina et al.

(10) Patent No.: US 10,362,313 B2
(45) Date of Patent: *Jul. 23, 2019

(54) VIDEO ENCODING METHOD AND VIDEO ENCODING FOR SIGNALING SAO PARAMETERS

(71) Applicant: SAMSUNG ELECTRONICS CO., LTD., Suwon-si (KR)

(72) Inventors: Elena Alshina, Suwon-si (KR); Alexander Alshin, Suwon-si (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,979

(22) Filed: Sep. 11, 2017

(65) Prior Publication Data

US 2018/0014020 A1    Jan. 11, 2018

Related U.S. Application Data

(63) Continuation of application No. 14/415,454, filed as application No. PCT/KR2013/006343 on Jul. 16, 2013, now Pat. No. 9,787,992.

(Continued)

(51) Int. Cl.
*H04N 19/14* (2014.01)
*H04N 19/103* (2014.01)
(Continued)

(52) U.S. Cl.
CPC .......... *H04N 19/14* (2014.11); *H04N 19/103* (2014.11); *H04N 19/13* (2014.11); *H04N 19/186* (2014.11);
(Continued)

(58) Field of Classification Search
None
See application file for complete search history.

(56) References Cited

U.S. PATENT DOCUMENTS 7,215,707 B2    5/2007  Lee et al.
7,292,165 B2   11/2007  Cha et al.
(Continued)

FOREIGN PATENT DOCUMENTS

CN          1200568 C       5/2005
JP        2011-24001 A      2/2011
(Continued)

OTHER PUBLICATIONS

Communication dated Nov. 6, 2013 issued in International Application No. PCT/KR2013/006343 (PCT/ISA/210/220).
(Continued)

*Primary Examiner* — Christopher Braniff
(74) *Attorney, Agent, or Firm* — Sughrue Mion, PLLC

(57) ABSTRACT

The present disclosure relates to signaling of sample adaptive offset (SAO) parameters determined to minimize an error between an original image and a reconstructed image in video encoding and decoding operations. An SAO decoding method includes obtaining context-encoded leftward SAO merge information and context-encoded upward SAO merge information from a bitstream of a largest coding unit (MCU); obtaining SAO on/off information context-encoded with respect to each color component, from the bitstream; if the SAO on/off information indicates to perform SAO operation, obtaining absolute offset value information for each SAO category bypass-encoded with respect to each color component, from the bitstream; and obtaining one of band position information and edge class information bypass-encoded with respect to each color component, from the bitstream.

5 Claims, 25 Drawing Sheets

Related U.S. Application Data

(60) Provisional application No. 61/672,166, filed on Jul. 16, 2012.

(51) Int. Cl.
    *H04N 19/186*     (2014.01)
    *H04N 19/13*     (2014.01)
    *H04N 19/82*     (2014.01)
    *H04N 19/91*     (2014.01)
    *H04N 19/463*     (2014.01)
    *H04N 19/86*     (2014.01)

(52) U.S. Cl.
    CPC ........... *H04N 19/463* (2014.11); *H04N 19/82* (2014.11); *H04N 19/91* (2014.11); *H04N 19/86* (2014.11)

(56) References Cited

U.S. PATENT DOCUMENTS

| | | | |
|---|---|---|---|
| 8,401,321 | B2 | 3/2013 | Lee |
| 10,212,425 | B2 | 2/2019 | Matsunobu et al. |
| 2011/0305274 | A1 | 12/2011 | Fu et al. |
| 2012/0082241 | A1 | 4/2012 | Tsai et al. |
| 2012/0082244 | A1 | 4/2012 | Chen et al. |
| 2012/0177103 | A1 | 7/2012 | Fu et al. |
| 2012/0177107 | A1 | 7/2012 | Fu et al. |
| 2013/0294501 | A1* | 11/2013 | Sze ...................... H04N 19/463 375/240.02 |
| 2014/0072033 | A1 | 3/2014 | Chuang et al. |

FOREIGN PATENT DOCUMENTS

| | | |
|---|---|---|
| KR | 10-2006-0110713 A | 10/2006 |
| KR | 10-2008-0082147 A | 9/2008 |
| RU | 2433562 C2 | 11/2011 |
| TW | I353119 B | 11/2011 |
| TW | I365423 B | 6/2012 |
| TW | 201404168 A | 1/2014 |
| WO | 2012/092787 A1 | 7/2012 |
| WO | 2012/092841 A1 | 7/2012 |

OTHER PUBLICATIONS

Written Opinion dated Nov. 6, 2013 issued in International Application PCT/KR2013/006343 (PCT/ISA/237).
Koohyar Minoo et al.,'Non-CE1: Coding of SAO Merge Left and Merge Up', Joint Collaborative Team on Video Coding (JCT-VC) of ITU-T SG 16 WP 3 and ISO/IEC JTC 1/SC 29/WG 11 [Document: JCTVC-I0507] 9th Meeting: Geneva, CH, Feb. 27, 2012 . May 7, 2012.
Woo-Shik Kim, 'CE1 Test 4.4 and 4.5: Removal of SAO Merge Flags in Interleaving Mode', Joint Collaborative Team on Video Coding (JCT-VC) of ITU-T SG 1 6 WP 3 and ISO/IEC JTC 1/SC 29/WG 11 [Document: JCTVC-I0196] 9th Meeting: Geneva, CH, Apr. 27, 2012-May 7, 2012.
Communication dated Feb. 9, 2016, issued by the European Patent Office in counterpart European Application No. 13819872.6.
In Suk Chong et al., "AHG6/AHG5: Simplified SAO coding", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Document: JCTVC-J0347, No. m25675, Total 7 pages, XP 030054009.
In Suk Chong et al., "AHG6/AHG5: Fix and simplification for SAO type index", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Document: JCTVC-J0104, Total 4 pages, XP 030112466, URL: http://wftp3.itu.int/av-arch/jctvc-site/.
Jun Xu et al., "AHG6: on SAO signalling", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Document: JCTVC-J0268r2, Total 12 pages, XP 030053930.
Communication dated Nov. 7, 2016, from the Intellectual Property Office of Taiwan in counterpart application No. 102125440.
Toru Matsunobu, et al., "AHG5/AHG6: Bypass coding for SAO syntax elements", Joint Collaborative Team on Video Coding (JCT-VC) of ITU-T SG 16 WP 3 and ISO/IEC JTC 1/SC 29/WG 11, 10th Meeting: Stockholm, Sweden, Jul. 11-20, 2012, Document: JCTVC-J0148 (11 Pages Total).
Guillaume Laroche, et al.,"Non-CE1: On SAO parameters reduction for Chroma", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, Document: JCTVC-I0183 (9 Pages Total).
Koohyar Minoo, et al., "Coding of SAO merge left and merge up flags", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Document: JCTVC-J0355-r2 (10 Pages Total).
Minhua Zhou., "AHG6: Independent luma and chroma SAO on/off control at slice level", Joint Collaborative Team on Video Coding (JCT-VC) of ITU-T SG 16 WP 3 and ISO/IEC JTC1/SC29/WG11, 10th Meeting: Stockholm, Sweden, Jul. 11-20, 2012, Document: JCTVC-J0087 M25409, (9 Pages Total).
E. Alshina, et al.,"AhG6: On SAO type sharing between U and V components", Joint Collaborative Team on Video Coding (JCT-VC) of ITU-T SG 16 WP 3 and ISO/IEC JTC 1/SC 29/WG 11, 10th Meeting: Stockholm, Sweden, Jul. 11-20, 2012, Document: JCTVC-J0045, (10 Pages Total).
E. Alshina, et al., "About an order of SAO syntax elements", Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, Document: JCTVC-K0265, XP030113147 (4 Pages Total).
Communication dated May 9, 2017, from the Japanese Patent Office in counterpart application No. 2015-523005.
Communication dated Jun. 2, 2017, from the State Intellectual Property Office of People's Republic of China in counterpart Application No. 201380048157.5.
Communication dated Jun. 28, 2017, from the Russian Patent Office in counterpart application No. 2015104987/08.
Communication dated Jul. 11, 2017, from the European Patent Office in counterpart European Application No. 13819872.6.
E. Alshina, "Additional test data for SAO contributions considered for adoption", Joint Collaborative Team on Video Coding (JCT-VC) of ITU-T SG 16 WP 3 and ISO/IEC JTC 1/SC 29/WG 11, 10th Meeting: Stockholm, Sweden, Jul. 11, 2012-Jul. 20, 2012, Document: JCTVC-J0563, pp. 1-6, Date Saved: Jul. 14, 2012, XP030112925. (6 pages total).
Communication dated Jan. 17, 2018 by the European Patent Office in counterpart European Patent Application No. 13819872.6.
Communication dated Mar. 26, 2018 by the Taiwan Intellectual Property Office in counterpart Taiwanese Patent Application No. 105139995.
Communication dated Jan. 29, 2019, issued by the Taiwan Patent Office in counterpart Taiwan Application No. 107113797.

* cited by examiner

FIG. 4

| 41 | 42 | 43 | 44 |
|---|---|---|---|
| EO CLASS = 0 | EO CLASS = 1 | EO CLASS = 2 | EO CLASS = 3 |
| HORIZONTAL | VERTICAL | 135° DIAGONAL | 45° DIAGONAL |
| X1 X0 X2 | X3 / X0 / X4 | X5 / X0 / X8 | X6 / X0 / X7 |

FIG. 5A

| CATEGORY | CONDITION |
|---|---|
| 1 | $Xc < Xa$ && $Xc < Xb$ |
| 2 | $(Xc < Xa$ && $Xc == Xb) \| (Xc == Xa$ && $Xc < Xb)$ |
| 3 | $(Xc > Xa$ && $Xc == Xb) \| (Xc == Xa$ && $Xc > Xb)$ |
| 4 | $Xc > Xa$ && $Xc > Xb$ |
| 0 | IF CONDITIONS FOR CATEGORIES 1, 2, 3, AND 4 ARE NOT SATISFIED |

FIG. 6A

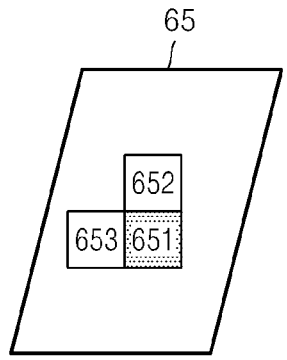

FIG. 6B

```
                                    /60
for( cIdx = 0; cIdx < 3; cIdx++ ){  // LOOP OPERATION WITH RESPECT TO 3
                                       COLOR COMPONENTS
    sao_merge_left_flag             // 1 BIN BY CONTEXT-ENCODING
    sao_merge_up_flag               // 1 BIN BY CONTEXT-ENCODING
    sao_type_idx                    // 6 BINS BY CONTEXT-ENCODING
    sao_band_position               // 5 BINS BY BYPASS-ENCODING
        for( i = 0; i < 4; i++ ){   // LOOP OPERATION WITH RESPECT TO 4
                                       SAO CATEGORIES
        sao_offset_abs              // 31 BINS BY CONTEXT-ENCODING
        sao_offset_sign             // 1 BIN BY BYPASS-ENCODING
        }
}
```

FIG. 7A

```
                  /-70
sao_param( rx, ry){
   if( rx > 0 ) {
      leftCtbInSlice = CtbAddrInSlice > 0
      leftCtbInTile = TileId[ CtbAddrTS ] = = TileId[ CtbAddrRStoTS[ CtbAddrRS - 1 ]]
      if( leftCtbInSlice && leftCtbInTile )
71 ——  sao_merge_left_flag
      }
   if( ry > 0 && !sao_merge_left_flag ) {
      upCtbInSlice = ( CtbAddrTS - CtbAddrRStoTS[CtbAddrRS - PicWidthInCtbs]) <= CtbAddrInSlice
      upCtbInTile = TileId[ CtbAddrTS ] = = TileId[ CtbAddrRStoTS[CtbAddrRS - PicWidthInCtbs ]]
      if( upCtbInSlice && upCtbInTile )
72 ——  sao_merge_up_flag
      }
   if( !sao_merge_up_flag && !sao_merge_left_flag ) {
73 ——    for( cIdx = 0; cIdx < 3; cIdx++ ){
            if (( slice_sao_flag_luma && cIdx == 0 ) || ( slice_sao_flag_chroma && cIdx > 0 )) {
74 ——         if ( cIdx == 0 ){
741 ——            sao_on_off_flag_luma[ rx ][ ry ]
                  if ( sao_on_off_flag_luma[ rx ][ ry ] )
743 ——               sao_eo_bo_flag_luma[ rx ][ ry ]
                  }
75 ——         if ( cIdx == 1 ){
751 ——            sao_on_off_flag_chroma[ rx ][ ry ]
                  if ( sao_on_off_flag_chromaa[ rx ][ ry ])
753 ——               sao_eo_bo_flag_chroma[ rx ][ ry ]
                  }
76 ——         if ( SaoTypeIdx[cIdx][ rx ][ ry ]!=0) {
                  for( i = 0; i < 4; i++ )
77 ——               sao_offset_abs[ cIdx ][ rx][ ry ][ i ]
78 ——            if(SaoTypeIdx[ cIdx][ rx ][ ry ]==1 ) {
                     for( i = 0; i < 4; i++ ) {
                        if( sao_offset_abs[ cIdx ][ rx ][ ry ][ i ] != 0 )
781 ——                       sao_offset_sign[ cIdx ][ rx ][ ry ][ i ]
                     }
782 ——               sao_band_position[ cIdx ][ rx ][ ry ]
                     }
79 ——            else{                      /-791
                     if ( cIdx==0 ) sao_eo_class_luma[ rx ][ ry ]
                     if ( cIdx == 1 ) sao_eo_class_chroma[ rx ][ ry ]
                     }                           \-793
                  }
               }
            }
         }
      }
   }
```

FIG. 7B

```
sao_param( rx, ry ){
    if( rx > 0 ) {
        leftCtbInSlice = CtbAddrInSlice > 0
        leftCtbInTile = TileId[ CtbAddrTS ] = = TileId[ CtbAddrRStoTS[ CtbAddrRS - 1 ]]
        if( leftCtbInSlice && leftCtbInTile )
71 ─────  sao_merge_left_flag
    }
    if( ry > 0 && !sao_merge_left_flag ) {
        upCtbInSlice = ( CtbAddrTS - CtbAddrRStoTS[CtbAddrRS - PicWidthInCtbs]) <= CtbAddrInSlice
        upCtbInTile = TileId[ CtbAddrTS ] = = TileId[ CtbAddrRStoTS[CtbAddrRS - PicWidthInCtbs ]]
        if( upCtbInSlice && upCtbInTile )
72 ─────  sao_merge_up_flag
    }
    if( !sao_merge_up_flag && !sao_merge_left_flag ) {
83 ─────    sao_on_off_flag_luma[ rx ][ ry ]
            if (sao_on_off_flag_luma[ rx ][ ry ])
    831 ─────  sao_eo_bo_flag_luma[ rx ][ ry ]
                if (sao_eo_bo_flag_luma[ rx ][ ry ]==1)
    833 ─────  sao_eo_class_luma[ rx ][ ry ]
84 ─────    sao_on_off_flag_chroma[ rx ][ ry ]
            if (sao_on_off_flag_chroma[ rx ][ ry ])
    841 ─────  sao_eo_bo_flag_chroma[ rx ][ ry ]
                if (sao_eo_bo_flag_chroma[ rx ][ ry ]==1)
    843 ─────  sao_eo_class_chroma[ rx ][ ry ]
85 ─────    for( cIdx = 0; cIdx < 3; cIdx++ ){
                if (SaoTypeIdx[cIdx][ rx ][ ry ]!=0) {
                    for( i = 0; i < 4; i++ )
87 ─────            sao_offset_abs[ cIdx ][ rx ][ ry ][ i ]
                    if(SaoTypeIdx[cIdx][ rx ][ ry ]==1) {
                        for( i = 0; i < 4; i++ ) {
                            if( sao_offset_abs[ cIdx ][ rx ][ ry ][ i ] != 0 )
    881 ─────             sao_offset_sign[ cIdx ][ rx ][ ry ][ i ]
                        }
    883 ─────         sao_band_position[ cIdx ][ rx ][ ry ]
                    }
                }
            }
        }
    }
}
```

FIG. 7C

```
sao_param( rx, ry ){
   if( rx > 0 ) {
      leftCtbInSlice = CtbAddrInSlice > 0
      leftCtbInTile = TileId[ CtbAddrTS ] = = TileId[ CtbAddrRStoTS[ CtbAddrRS - 1 ]]
      if( leftCtbInSlice && leftCtbInTile )
71 ─── sao_merge_left_flag
   }
   if( ry > 0 && !sao_merge_left_flag ) {
      upCtbInSlice = ( CtbAddrTS - CtbAddrRStoTS[CtbAddrRS - PicWidthInCtbs]) <= CtbAddrInSlice
      upCtbInTile = TileId[ CtbAddrTS ] = = TileId[ CtbAddrRStoTS[CtbAddrRS - PicWidthInCtbs ]]
      if( upCtbInSlice && upCtbInTile )
72 ─── sao_merge_up_flag
   }
   if( !sao_merge_up_flag && !sao_merge_left_flag ) {
83 ───    sao_on_off_flag_luma[ rx ][ ry ]
84 ───    sao_on_off_flag_chroma[ rx ][ ry ]
         if (sao_on_off_flag_luma[ rx ][ ry ])
831 ───    sao_eo_bo_flag_luma[ rx ][ ry ]
         if (sao_eo_bo_flag_luma[ rx ][ ry ]==1)
833 ───    sao_eo_class_luma[ rx ][ ry ]
84 ───    sao_on_off_flag_chroma[ rx ][ ry ]
         if (sao_on_off_flag_chroma[ rx ][ ry ])
841 ───    sao_eo_bo_flag_chroma[ rx ][ ry ]
         if (sao_eo_bo_flag_chroma[ rx ][ ry ]==1)
843 ───    sao_eo_class_chroma[ rx ][ ry ]
85 ───   for( cIdx = 0; cIdx < 3; cIdx++ ){
            if (SaoTypeIdx[cIdx][ rx ][ ry ]!=0) {
               for( i = 0; i < 4; i++ )
87 ───         sao_offset_abs[ cIdx ][ rx ][ ry ][ i ]
                  if(SaoTypeIdx[cIdx][ rx ][ ry ]==1) {
                     for( i = 0; i < 4; i++ ) {
                        if( sao_offset_abs[ cIdx ][ rx ][ ry ][ i ] != 0 )
881 ───                sao_offset_sign[ cIdx ][ rx ][ ry ][ i ]
                     }
883 ───             sao_band_position[ cIdx ][ rx ][ ry ]
                  }
               }
            }
         }
      }
   }
}
```

FIG. 14
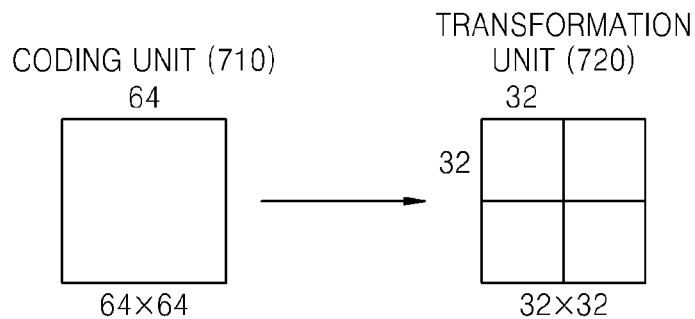
FIG. 15
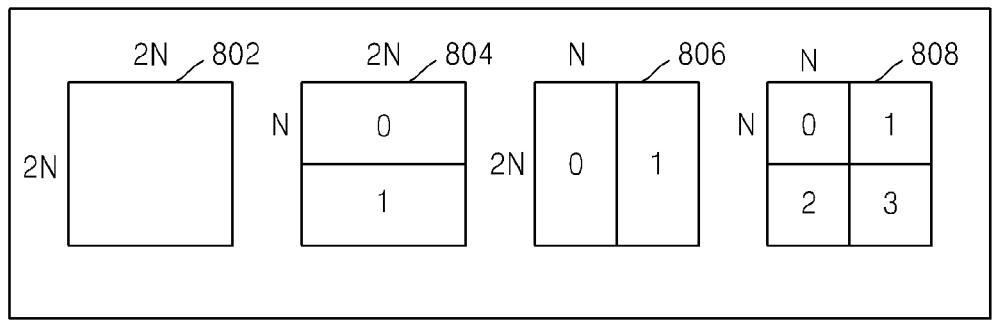
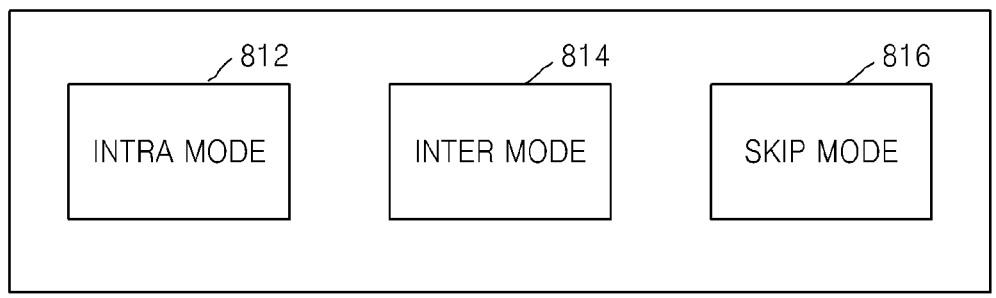
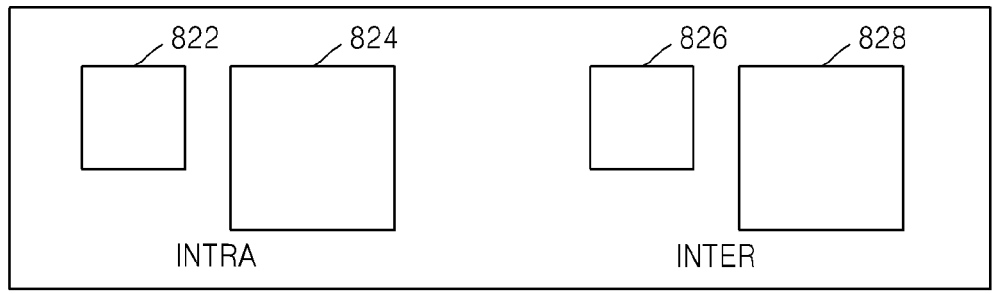

CODING UNIT (1010)

PREDICTION UNIT (1060)

VIDEO ENCODING METHOD AND VIDEO ENCODING FOR SIGNALING SAO PARAMETERS

CROSS-REFERENCE TO RELATED PATENT APPLICATION

The present application is a continuation application of U.S. patent application Ser. No. 14/415,454, filed on Jan. 16, 2015, in the U.S. Patent and Trademark Office, which is a national stage application under 35 U.S.C. § 371 of International Application No. PCT/KR2013/006343, filed on Jul. 16, 2013, which claims the benefit of U.S. Provisional Application No. 61/672,166, filed on Jul. 16, 2012, in the U.S. Patent and Trademark Office, the disclosures of which are herein incorporated by reference in their entireties.

BACKGROUND

1. Field

Methods and apparatuses consistent with exemplary embodiments of the present application relate to adjusting reconstructed pixel values by offsets determined adaptively to minimize an error between an original image and a reconstructed image in video encoding and decoding operations.

2. Description of Related Art

As hardware for reproducing and storing high resolution or high quality video content is being developed, a video codec is increasingly needed for effectively encoding or decoding the high resolution or high quality video content. According to a conventional video codec, a video is encoded according to a limited encoding method based on a macroblock having a predetermined size.

Image data of the space domain is transformed into coefficients of the frequency domain via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of the space domain, coefficients of the frequency domain are easily compressed. In particular, because an image pixel value of the space domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

SUMMARY Aspects of exemplary embodiments relate to signaling of sample adaptive offset (SAO) parameters determined to minimize an error between an original image and a reconstructed image in video encoding and decoding operations.

According to an aspect of an exemplary embodiment, there is provided a sample adaptive offset (SAO) decoding method including obtaining context-encoded leftward SAO merge information and context-encoded upward SAO merge information from a bitstream of a largest coding unit (MCU); obtaining SAO on/off information context-encoded with respect to each color component, from the bitstream; if the SAO on/off information indicates to perform SAO operation, obtaining absolute offset value information for each SAO category bypass-encoded with respect to each color component, from the bitstream; and obtaining one of band position information and edge class information bypass-encoded with respect to each color component, from the bitstream.

The obtaining of the SAO on/off information may include, if the SAO on/off information indicates to perform SAO operation, further obtaining edge band identification information encoded in a bypass mode with respect to each color component, from the bitstream, and context decoding may be performed on the SAO on/off information in a first bin of SAO type information of the MCU, and bypass decoding may be performed on remaining bits of the SAO type information other than the SAO on/off information.

The obtaining of the band position information or the edge class information may include, if the obtained edge band identification information indicates a band type, obtaining the band position information bypass-encoded with respect to each color component, from the bitstream, the obtaining of the band position information may include, if the absolute offset value information obtained for each SAO category is not 0, obtaining the band position information and offset sign information bypass-encoded with respect to each color component, from the bitstream, and the band position information may be lastly obtained from among SAO parameters of the MCU.

The obtaining of the band position information or the edge class information may include, if the obtained edge band identification information indicates an edge type, obtaining the edge class information bypass-encoded with respect to each color component, from the bitstream, and the edge class information may include edge class information for a luma component and edge class information for a first chroma component, and the edge class information for the first chroma component may be equally applied to a second chroma component.

The SAO on/off information and the edge band identification information for a first chroma component may be equally applied to a second chroma component, and the leftward SAO merge information and the upward SAO merge information may be commonly applied to a luma component, and the first and second chroma components of the MCU.

The obtaining of the leftward SAO merge information and the upward SAO merge information may include determining a context-based probability model of the leftward SAO merge information, performing entropy decoding by using the determined probability model of the leftward SAO merge information, and thus reconstructing the leftward SAO merge information; and determining a context-based probability model of the upward SAO merge information, performing entropy decoding by using the determined probability model of the upward SAO merge information, and thus reconstructing the upward SAO merge information, and the obtaining of the SAO on/off information may include determining a context-based probability model of the SAO on/off information, performing entropy decoding by using the determined probability model of the SAO on/off information, and thus reconstructing the SAO on/off information.

The obtaining of the absolute offset value information may include determining a context-based probability model of the absolute offset value information, performing entropy decoding without using the determined probability model of the absolute offset value information, and thus reconstructing the absolute offset value information, the obtaining of the offset sign information and the band position information may include performing entropy decoding without using a context-based probability model of the offset sign information, and thus reconstructing the offset sign information; and performing entropy decoding without using a context-based probability model of the band position information, and thus reconstructing the band position information, and the obtaining of the edge class information may include performing entropy decoding without using a context-based probability model of the edge class information, and thus reconstructing the edge class information.

According to aspects of the present disclosure, there is provided a sample adaptive offset (SAO) encoding method including outputting 1 bit of leftward SAO merge information and 1 bit of upward SAO merge information of a largest coding unit (MCU), generated by performing context encoding on each of the leftward SAO merge information and the upward SAO merge information; outputting 1 bit of SAO on/off information generated by performing context encoding on the SAO on/off information with respect to each color component; if the SAO on/off information indicates to perform SAO operation, outputting a bitstream of absolute offset value information generated by performing bypass encoding on the absolute offset value information with respect to each color component and each SAO category; and outputting a remaining bitstream generated by performing bypass encoding on one of band position information and edge class information with respect to each color component.

The outputting of the 1 bit of the SAO on/off information may include, if the SAO on/off information indicates to perform SAO operation, further outputting 1 bit of edge band identification information generated by performing bypass encoding on the edge band identification information with respect to each color component, and context encoding may be performed on the SAO on/off information in a first bin of SAO type information of the MCU, and bypass encoding may be performed on remaining bits of the SAO type information other than the SAO on/off information.

The outputting of the remaining bitstream may include, if the edge band identification information indicates a band type, outputting a bitstream of the band position information generated by performing bypass encoding on the band position information with respect to each color component, the outputting of the band position information may include, if the absolute offset value information for each SAO category is not 0, outputting the generated bitstream of the band position information and a bitstream of offset sign information generated by performing bypass encoding on the offset sign information, and the band position information may be lastly output from among SAO parameters of the MCU.

The outputting of the remaining bitstream may include, if the edge band identification information indicates an edge type, outputting a bitstream of the edge class information generated by performing bypass encoding on the edge class information with respect to each color component, and According to aspects of the present disclosure, there is provided a sample adaptive offset (SAO) decoding apparatus including an SAO context decoder for obtaining context-encoded leftward SAO merge information and upward SAO merge information and obtaining SAO on/off information context-encoded with respect to each color component, from a bitstream of a largest coding unit (MCU); an SAO bypass decoder for, if the SAO on/off information indicates to perform SAO operation, obtaining absolute offset value information bypass-encoded with respect to each color component and each SAO category, and obtaining one of band position information and edge class information bypass-encoded with respect to each color component, from the bitstream; and an SAO operator for, if the SAO on/off information indicates to perform SAO operation, adjusting reconstructed values of the MCU for each SAO category based on the absolute offset value information by using the obtained information.

According to aspects of the present disclosure, there is provided a sample adaptive offset (SAO) encoding apparatus including an SAO operator for performing SAO operation on a largest coding unit (MCU); an SAO context encoder for generating and outputting a bitstream of leftward SAO merge information and a bitstream of upward SAO merge information of the MCU by performing context encoding on each of the leftward SAO merge information and the upward SAO merge information, and generating and outputting 1 bit of SAO on/off information by performing context encoding on the SAO on/off information with respect to each color component; and an SAO bypass encoder for, if the SAO on/off information indicates to perform SAO operation, generating and outputting a bitstream of absolute offset value information by performing bypass encoding on the absolute offset value information with respect to each color component and each SAO category, and generating and outputting a remaining bitstream by performing bypass encoding on one of band position information and edge class information with respect to each color component.

According to aspects of the present disclosure, there is provided a computer-readable recording medium having recorded thereon a computer program for executing the above method.

In methods of encoding and decoding sample adaptive offset (SAO) parameters, according to various exemplary embodiments of the present disclosure, because context encoding and context decoding are performed on only SAO merge information and SAO on/off information from among the SAO parameters, and bypass encoding and bypass decoding are performed on a remaining bitstream, a total amount of calculation for decoding the SAO parameters may be reduced.

Also, from among the SAO parameters, because some parameters are determined differently with respect to each color component and some parameters are set to be the same with respect to first and second chroma components, or with respect to luma, and first and second chroma components, a total bit length of the SAO parameters may be reduced and the amount of data to be parsed may also be reduced.

Furthermore, by reducing iterations of encoding and decoding operations, as well as reducing switching of bypass encoding and decoding operations, the efficiency of overall entropy encoding and decoding operations on the SAO parameters may be improved.

BRIEF DESCRIPTION OF THE DRAWINGS

FIG. 4 illustrates a table showing edge classes of edge types, according to an exemplary embodiment of the present disclosure;

FIGS. 5A and 5B respectively illustrate a table and a graph showing categories of edge types, according to exemplary embodiments of the present disclosure;

FIG. 6A illustrates a diagram showing adjacent maximum coding units (MCUs) referred to merge SAO parameters with a current MCU, according to exemplary embodiments of the present disclosure;

FIG. 6B illustrates a diagram of a process of performing entropy encoding on SAO parameters, according to another exemplary embodiment of the present disclosure;

FIG. 7A illustrates SAO syntax of a coding unit, according to exemplary embodiments of the present disclosure;

FIGS. 7B and 7C illustrate SAO syntax of a coding unit, according to other exemplary embodiments of the present disclosure;

FIG. 14 illustrates a diagram for describing a relationship between a coding unit and transformation units, according to exemplary embodiments of the present disclosure;

FIG. 15 illustrates a diagram for describing encoding information of coding units corresponding to a coded depth, according to exemplary embodiments of the present disclosure;

DETAILED DESCRIPTION OF EXEMPLARY EMBODIMENTS

Figure 1A:
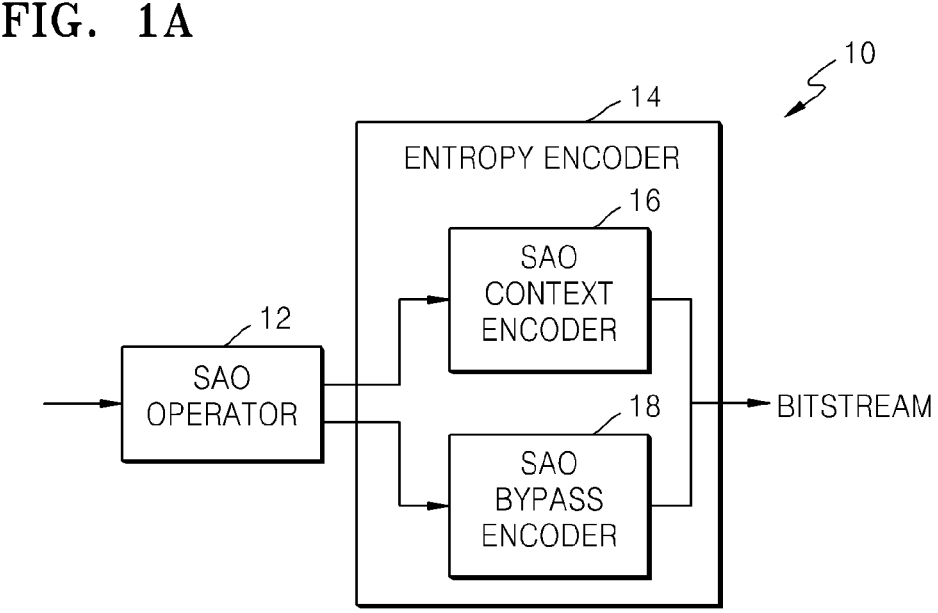
FIGS. 1A and 1B respectively illustrate a block diagram of a sample adaptive offset (SAO) encoding apparatus and a flowchart of an SAO encoding method, according to exemplary embodiments of the present disclosure.

Hereinafter, a video encoding technique and a video decoding technique using a sample adaptive offset (SAO) operation based on pixel classification, according to exemplary embodiments of the present disclosure, will be described with reference to FIGS. 1A through 7C. Also, the SAO operation based on pixel classification in a video encoding technique and a video decoding technique based on coding units having a tree structure, according to exemplary embodiments of the present disclosure, will be described with reference to FIGS. 8 through 20.

Hereinafter, an 'image' may denote a still image or a moving image of a video, or a video itself.

Hereinafter, expressions such as "at least one of" do not necessarily modify an entirety of a following list and do not necessarily modify each member of the list, such that "at least one of a, b, and c" should be understood as including only one of a, only one of b, only one of c, or any combination of a, b, and c.

A video encoding technique and a video decoding technique using an SAO operation based on pixel classification, according to exemplary embodiments of the present disclosure, will now be described with reference to FIGS. 1A through 7C. An SAO encoding apparatus 10 and an SAO decoding apparatus 20 illustrated in FIGS. 1A and 2A, perform SAO operations in FIGS. 1B and 2B to minimize an error between an original pixel and a reconstructed pixel, and transmit and receive SAO parameters for performing an SAO operation.

The SAO encoding apparatus 10 using an SAO operation classifies pixels of each image block into predetermined pixel groups, allocates each pixel to a corresponding pixel group, and encodes an offset value indicating an average value of errors between original pixels and reconstructed pixels included in the same pixel group.

Samples are signaled between the SAO encoding apparatus 10 and the SAO decoding apparatus 20. In other words, the SAO encoding apparatus 10 may encode samples generated by performing video encoding and may transmit the samples as a bitstream, and the SAO decoding apparatus 20 may parse and reconstruct the samples from the received bitstream.

The SAO encoding apparatus 10 and the SAO decoding apparatus 20 signal SAO parameters for SAO operation to minimize errors between original pixels and reconstructed pixels by adjusting reconstructed pixel values by offsets determined based on pixel classification. Offset values are encoded, transmitted, and received as SAO parameters between the SAO encoding apparatus 10 and the SAO decoding apparatus 20, and then are decoded from the SAO parameters.

Accordingly, the SAO decoding apparatus 20 may generate reconstructed pixels of each image block by decoding the received bitstream, may adjust the reconstructed pixels by offset values reconstructed from the bitstream, and thus may generate a reconstructed image having a minimized error from an original image.

Operation of the SAO encoding apparatus 10 for performing an SAO operation will be described in detail with reference to FIGS. 1A and 1B, and operation of the SAO decoding apparatus 20 for performing an SAO operation will be described in detail with reference to FIGS. 2A and 2B.

Figure 1B:
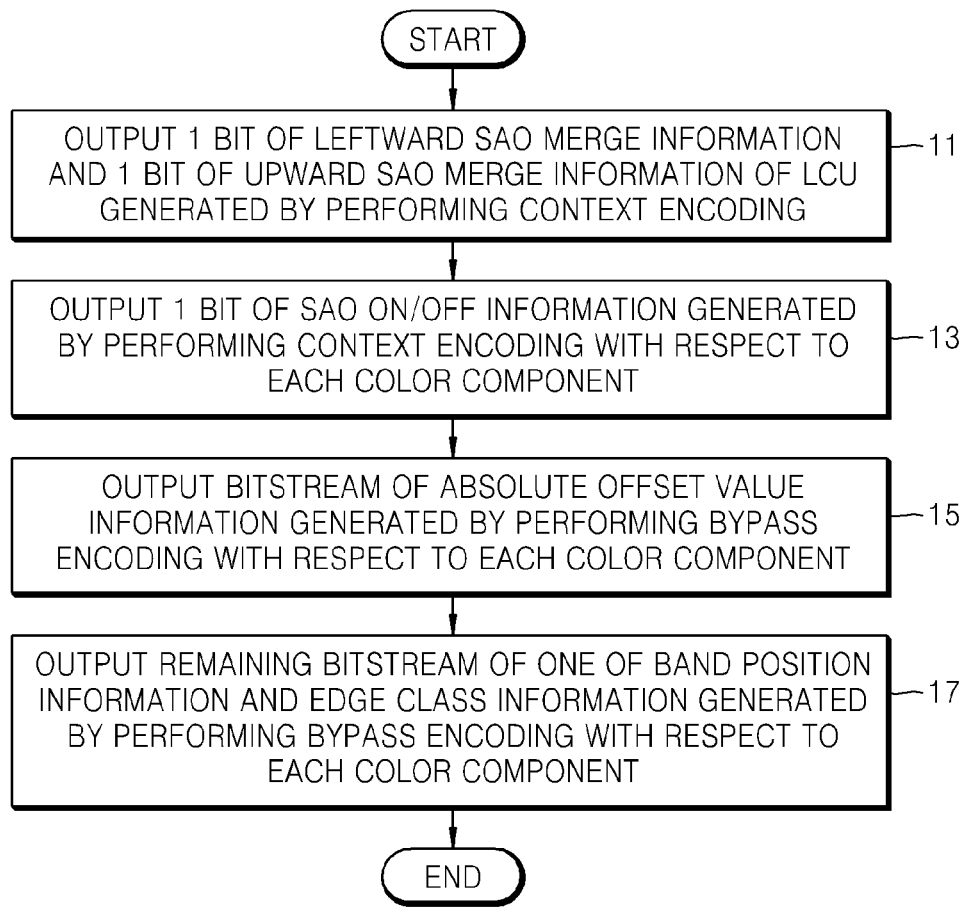

FIGS. 1A and 1B respectively illustrate a block diagram of the SAO encoding apparatus 10 and a flowchart of an SAO encoding method, according to exemplary embodiments of the present disclosure.

The SAO encoding apparatus 10 includes an SAO operator 12 and an entropy encoder 14. The entropy encoder 14 includes an SAO context encoder 16 and an SAO bypass encoder 18 for encoding SAO parameters.

The SAO encoding apparatus 10 receives an input of images of a video, for example, slices, splits each image into blocks, and encodes each block. A block may have a square shape, a rectangular shape, or an arbitrary geometrical shape, and is not limited to a data unit having a predetermined size. The block may be a maximum coding unit (MCU) (also referred to herein as a largest coding unit LCU), having a maximum size among coding units, or a coding unit among coding units having a tree structure. Video encoding and decoding methods based on coding units having a tree structure will be described below with reference to FIGS. 8 through 20.

The SAO encoding apparatus 10 may split each input image into MCUs, and may output resultant data generated by performing prediction, transformation, and entropy encoding on samples of each MCU, as a bitstream. Samples of an MCU may be pixel value data of pixels included in the MCU.

The SAO encoding apparatus 10 may individually encode MCUs of a picture. The SAO encoding apparatus 10 may encode a current MCU based on coding units split from the current MCU and having a tree structure.

In order to encode the current MCU, the SAO encoding apparatus 10 may encode samples by performing intra prediction, inter prediction, transformation, and quantization on each of coding units included in the current MCU and having a tree structure.

The SAO encoding apparatus 10 may reconstruct the encoded samples included in the current MCU by performing inverse quantization, inverse transformation, and inter prediction or motion compensation on each of the coding units having a tree structure to decode the coding units. A reconstructed image may be generated by encoding and then decoding previous slices of the encoded samples. A reconstructed image of a previous slice may be referenced to perform inter prediction on a current slice.

In order to minimize an error between original pixels, before the current MCU is encoded, and reconstructed pixels, after the current MCU is decoded, the SAO operator 12 may determine offset values indicating difference values between the original pixels and the reconstructed pixels.

The SAO operator 12 may perform an SAO operation on each color component. For example, with respect to a YCrCb color image, an SAO operation may be performed on each of a luma component (Y component) and first and second chroma components (Cr and Cb components).

The SAO operator 12 may determine whether to perform an SAO operation on the luma component of a current slice. The SAO operator 12 may determine whether to perform an SAO operation on the first and second chroma components of the current slice, wherein the first and second chroma components are regarded as the same component. In other words, if an SAO operation is performed on the first chroma color component, the SAO operation may also be performed on the second chroma component. If an SAO operation is not performed on the first chroma color component, the SAO operation may not be performed on the second chroma component, either.

The entropy encoder 14 may generate SAO parameters of a current slice and may include the SAO parameters in a header of the current slice.

The SAO operator 12 may determine whether to perform an SAO operation on each MCU. According to the determination of the SAO operator 12, the SAO context encoder 16 may generate luma SAO on/off information indicating whether to perform SAO operation on the luma component. Also, according to the determination of the SAO operator 12, the SAO context encoder 16 may generate chroma SAO on/off information indicating whether to perform SAO operation on the first and second chroma components.

The SAO context encoder 16 may include luma SAO on/off information and chroma SAO on/off information in the SAO parameters of an MCU.

The SAO operator 12 may determine the offset values with respect to each MCU. The SAO parameters including the offset values, an SAO type, and an SAO class may also be determined with respect to each MCU.

The SAO operator 12 may determine the SAO type according to a pixel value classification method of the current MCU. The SAO type may be determined as an edge type or a band type. According to a pixel value classification method of a current block, it may be determined whether to classify pixels of the current block according to the edge type or the band type.

If the SAO type is the edge type, according to a direction and a shape of edges formed between the reconstructed pixels of the current MCU and their adjacent pixels, an offset between the reconstructed pixels and the original pixels may be determined.

If the SAO type is the band type, from among a plurality of bands obtained by dividing a total range of pixel values of the reconstructed pixels of the current MCU, an offset between the reconstructed pixels and the original pixels included in each band may be determined. The bands may be obtained by evenly (i.e., equally) or unevenly (i.e., unequally) dividing the total range of the pixel values.

Accordingly, the SAO operator 12 may determine the SAO type of the current MCU, which indicates the edge type or the band type, based on spatial characteristics of pixel values of the current MCU.

The SAO operator 12 may determine an SAO class of each of the reconstructed pixels according to the SAO type of the current MCU. The SAO class may be determined as an edge class or a band class.

With respect to the edge type, the edge class may indicate a direction of edges formed between the reconstructed pixels and their adjacent pixels. The edge class may indicate an edge direction of 0°, 90°, 45°, or 135°.

If the SAO type is the edge type, the SAO operator 12 may determine the edge class of each of the reconstructed pixels of the current MCU.

With respect to the band type, from among a plurality of bands that are a predetermined number of continuous pixel value periods obtained by dividing a total range of pixel values of the current MCU, the band class may indicate positions of the bands to which pixel values of the reconstructed pixels belong.

For example, with respect to a sample having a pixel value of 8 bits, a total range of the pixel value is from 0 to 255 and the pixel value may be classified into a total of 32 bands. In this case, from among the 32 bands, a predetermined number of bands to which pixel values of the reconstructed pixels belong may be determined. The band class may indicate a start position of a predetermined number of continuous bands (a left start point) by using one of band indices from 0 to 31.

With respect to the edge type, the reconstructed pixels of the current MCU may be classified into a predetermined number of categories according to the shape of edges formed between the reconstructed pixels and their adjacent pixels. For example, according to four edge shapes, such as a local valley of a concave edge, a curved corner of a concave edge, a curved corner of a convex edge, and a local peak of a convex edge, the reconstructed pixels, may be classified into four categories. According to an edge shape of each of the reconstructed pixels of the current MCU, one of the four categories may be determined.

With respect to the band type, according to positions of bands to which pixel values of the reconstructed pixels of the current MCU belong, the reconstructed pixels may be classified into a predetermined number of categories. For example, according to band indices of four continuous bands from a start position indicated by the band class, i.e., a start point of the leftmost band, the reconstructed pixels may be classified into four categories. According to one of the four bands, to which each of the reconstructed pixels of the current MCU belongs, one of the four categories may be determined.

The SAO operator 12 may determine a category of each of the reconstructed pixels of the current MCU. With respect to the reconstructed pixels of the current MCU, which belong to the same category, the SAO operator 12 may determine offset values by using difference values between the reconstructed pixels and the original pixels. In each category, an average of the difference values between the reconstructed pixels and the original pixels, i.e., an average error of the reconstructed pixels, may be determined as an offset value corresponding to a current category. The SAO operator 12 may determine an offset value of each category and may determine offset values of all categories as the offset values of the current MCU.

For example, if the SAO type of the current MCU is the edge type and the reconstructed pixels are classified into four categories according to edge shapes, or if the SAO type of the current MCU is the band type and the reconstructed pixels are classified into four categories according to indices of four continuous bands, the SAO operator 12 may determine four offset values by determining an average error between the reconstructed pixels and the original pixels, which belong to each of the four categories.

Each of the offset values may be greater than or equal to a preset minimum value and may be less than or equal to a preset maximum value.

The entropy encoder 14 may encode and output the SAO parameters including the SAO type, the SAO class, and the offset values of the current MCU, which are determined by the SAO operator 12.

The SAO parameters of each block may include an SAO type and offset values of the block. Among the SAO type, an off type, the edge type, or the band type may be output.

If the SAO type is the off type, it may be indicated that an SAO operation is not applied to the current MCU. In this case, remaining SAO parameters of the current MCU may not necessarily be encoded.

If the SAO type is the edge type, the SAO parameters may include offset values individually corresponding to edge classes. Otherwise, if the SAO type is the band type, the SAO parameters may include offset values individually corresponding to bands. In other words, the entropy encoder 14 may encode the SAO parameters of each block.

As described above, the SAO operator 12 may perform an SAO operation on each of MCUs of an image.

According to entropy encoding methods, the SAO parameters may be classified into parameters to be encoded based on context-based entropy coding, and parameters to be encoded in a bypass mode.

The context-based entropy coding method may include a series of operations, such as binarization for transforming symbols such as the SAO parameters into a bitstream, and context-based arithmetic encoding on the bitstream. Context adaptive binary arithmetic coding (CABAC) is broadly used an example of the context-based arithmetic encoding method. According to context-based arithmetic encoding and decoding, each bit of a symbol bitstream may be regarded as a bin of context, and each bit position may be mapped to a bin index. A length of the bitstream, i.e., a length of bins, may vary according to sizes of symbol values. For context-based arithmetic encoding and decoding, context-based probability modeling needs to be performed on symbols.

Context-based probability modeling needs to be performed on the assumption that a coding bit of a current symbol is probabilistically predicted based on previously encoded symbols. For context-based probability modeling, context of each bit position of a symbol bitstream, i.e., each bin index, needs to be updated. Here, probability modeling refers to a process of analyzing a probability that a value of 0 or 1 is generated in each bin. A process of updating context by reflecting a result of analyzing a probability of each bit of the symbols of a new block to the context may be repeated in every block. If the above-described probability modeling is repeated, a probability model in which each bin is matched to a probability may be determined.

Accordingly, with reference to the context-based probability model, an operation of selecting and outputting a code corresponding to current context may be performed with respect to each bit of a binarized bitstream of current symbols, thereby performing context-based entropy encoding.

An operation of determining a context-based probability model of each bin of symbols for encoding based on context-based entropy coding requires large amounts of calculation and time. On the other hand, the entropy encoding in a bypass mode includes an entropy encoding operation using a probability model without considering the context of symbols.

The entropy encoder 14 may include the SAO context encoder 16 for performing encoding based on context-based entropy coding (hereinafter referred to as 'context encoding') on the SAO parameters, and the SAO bypass encoder 18 for performing entropy encoding in a bypass mode (hereinafter referred to as 'bypass encoding') on the SAO parameters.

The SAO context encoder 16 may perform context encoding on leftward SAO merge information, upward SAO merge information, and SAO on/off information of an MCU.

The SAO bypass encoder 18 may perform bypass encoding on absolute offset value information and band position information or edge class information with respect to each color component.

An example that the SAO context encoder 16 and the SAO bypass encoder 18 output the SAO parameters will be described in detail below with reference to the flowchart of the SAO encoding method of FIG. 1B.

The SAO operator 12 may determine whether to perform SAO operation, an SAO method, and SAO parameters with respect to each MCU of a current slice.

In operation 11, the SAO context encoder 16 may generate a 1-bit flag of leftward SAO merge information by performing context encoding on the leftward SAO merge information of a current MCU. Also, the SAO context encoder 16 may generate a 1-bit flag of upward SAO merge information by performing context encoding on the upward SAO merge information of the current MCU.

The entropy encoder 14 may determine whether to adopt SAO parameters of left and upper adjacent MCUs of a current MCU as the SAO parameters of the current MCU with respect to all color components, such as luma and chroma components without separating the luma and chroma components.

Initially, based on whether to predict the SAO parameters of the current MCU by using the SAO parameters of the left MCU, the entropy encoder 14 may generate leftward SAO merge information of the current MCU. In other words, without separating the luma component and the first and second chroma components, the same leftward SAO merge information may be generated.

Then, based on whether to predict the SAO parameters of the current MCU by using the SAO parameters of the upper MCU, the entropy encoder 14 may generate upward SAO merge information of the current MCU. Without separating the luma component and the first and second chroma components, the same upward SAO merge information may be generated.

In operation 13, the SAO context encoder 16 may perform context encoding on SAO on/off information with respect to each color component. The SAO context encoder 16 may generate a 1-bit flag of the SAO on/off information generated due to context encoding.

The SAO operator 12 may allocate a first bit of SAO type information to the SAO on/off information indicating whether to perform SAO operation on the current MCU. The SAO context encoder 16 may perform context-based CABAC encoding on only a first bin of the SAO type information.

If the SAO on/off information indicates to perform the SAO operation, the SAO bypass encoder 18 may perform bypass encoding on edge band identification information with respect to each color component. The SAO bypass encoder 18 may output 1 bit of the edge band identification information generated due to bypass encoding.

The SAO bypass encoder 18 may allocate a second bit of the SAO type information to the edge band identification information indicating whether to perform edge SAO operation or band SAO operation on the current MCU. The SAO bypass encoder 18 may perform bypass-mode CABAC encoding on a second bin of the SAO type information.

In other words, if SAO operation is performed, the entropy encoder 14 may output the context-encoded flag of the SAO on/off information and the bypass-encoded flag of the edge band identification information as the SAO type information.

The SAO operator 12 may apply the same SAO on/off information to the first and second chroma components. Also, the SAO operator 12 may apply the same edge band identification information to the first and second chroma components. Accordingly, the entropy encoder 14 may perform entropy encoding on the SAO on/off information and the edge band identification information for the luma component and the first chroma component, and then may not perform entropy encoding again on the SAO on/off information and the edge band identification information for the second chroma component.

In operation 15, if the SAO on/off information indicates to perform the SAO operation, the SAO bypass encoder 18 may perform bypass encoding on absolute offset value information for each SAO category and each color component. The SAO bypass encoder 18 may output a bitstream of the absolute offset value information generated due to bypass encoding.

The SAO bypass encoder 18 may perform bypass encoding on the absolute offset value information for each of the luma component and the first and second chroma components. Also, bypass encoding may be performed on the absolute offset value information with respect to each of four categories and each color component.

The SAO encoding apparatus 10 may perform bypass-mode CABAC encoding on the absolute offset value information from among the SAO parameters of the MCU. The absolute offset value information may indicate a value within a range based on a bit depth of a video. For example, if the bit depth corresponds to 8 bits, the absolute offset value may be a value equal to or greater than 0 and equal to or less than 7. As another example, if the bit depth corresponds to 10 bits, the absolute offset value may be a value equal to or greater than 0 and equal to or less than 31.

In operation 17, the SAO bypass encoder 18 may perform bypass encoding on one of band position information and edge class information with respect to each color component. A remaining bitstream of the SAO type information other than the SAO on/off information and the edge band identification information may be allocated to the band position information or the edge class information. The SAO bypass encoder 18 may output the remaining bitstream of the band position information or the edge class information generated due to bypass encoding.

If the edge band identification information indicates a band type, the SAO bypass encoder 18 may perform bypass encoding on the band position information with respect to each color component. The band position information indicates a left start point of bands as an SAO class of a band type. The band position information may be determined as a bitstream having a fixed bit length.

If the absolute offset value information for each SAO category is not 0, the SAO bypass encoder 18 may perform bypass encoding on offset sign information. Accordingly, the SAO bypass encoder 18 may output the bypass-encoded bitstream of the offset sign information and the band position information as the remaining bitstream of the SAO type information indicating a band SAO type. The SAO bypass encoder 18 may lastly output the band position information from among the SAO parameters of the MCU.

The offset sign information and the band position information of the band SAO type may be determined with respect to each of the luma component and the first and second chroma components. Accordingly, the SAO bypass encoder 18 may perform bypass encoding on the offset sign information and the band position information with respect to each of the luma component and the first and second chroma components. A bitstream of band class information generated due to bypass encoding may be output as the remaining bitstream of the SAO type information.

If the edge band identification information indicates an edge type, the SAO bypass encoder 18 may perform bypass encoding on edge class information with respect to each color component. A bitstream of the edge class information generated due to bypass encoding may be output as the remaining bitstream of the SAO type information.

The edge class information may be determined with respect to the luma component and the first chroma component. The edge class information determined with respect to the first chroma component may equally be applied to the second chroma component. Accordingly, the SAO bypass encoder 18 may set the edge class information with respect to the luma component and the first chroma component, and then may not set the edge class information again with respect to the second chroma component.

The SAO encoding apparatus 10 may include a central processor (CPU) for collectively controlling the SAO operator 12, the entropy encoder 14, the SAO context encoder 16, and the SAO bypass encoder 18. Alternatively, the SAO operator 12, the entropy encoder 14, the SAO context encoder 16, and the SAO bypass encoder 18 may be driven by their individual processors that cooperatively operate to control the SAO encoding apparatus 10. Alternatively, an external processor outside the SAO encoding apparatus 10 may control the SAO operator 12, the entropy encoder 14, the SAO context encoder 16, and the SAO bypass encoder 18.

The SAO encoding apparatus 10 may include one or more memories for storing input and output data of the SAO operator 12, the entropy encoder 14, the SAO context encoder 16, and the SAO bypass encoder 18. The SAO encoding apparatus 10 may include a memory controller for managing data input and output to and from the memories.

In order to perform a video encoding operation including transformation and to output a result of the video encoding operation, the SAO encoding apparatus 10 may operate in association with an internal or external video encoding processor. The internal video encoding processor of the SAO encoding apparatus 10 may be an independent processor for performing a video encoding operation. Also, the SAO encoding apparatus 10, a central processing unit, or a graphic processing unit (GPU) may include a video encoding processor module to perform a basic video encoding operation.

Figure 2A:
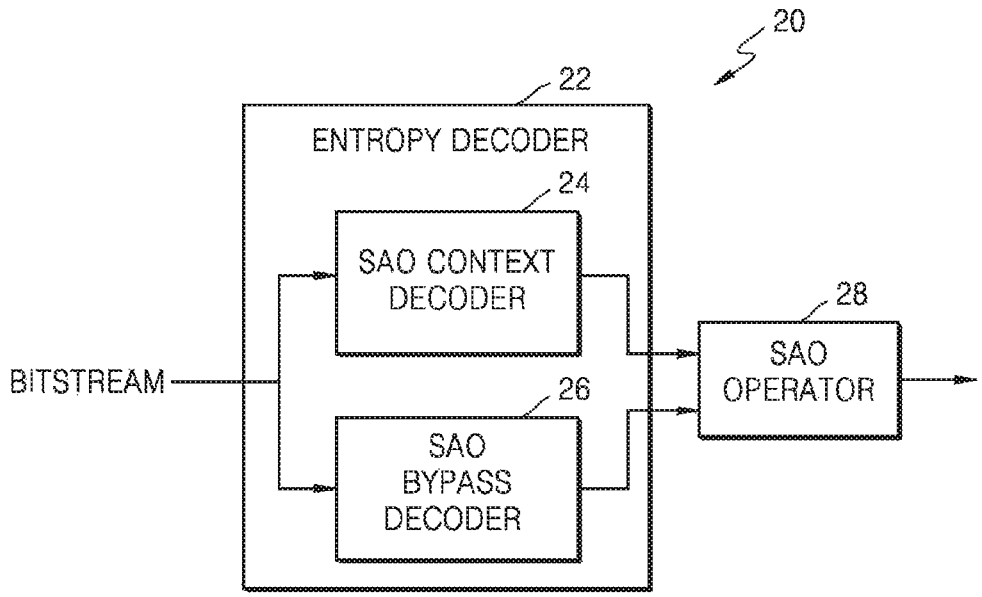
FIGS. 2A and 2B respectively illustrate a block diagram of an SAO decoding apparatus and a flowchart of an SAO decoding method, according to exemplary embodiments of the present disclosure.
Figure 2B:
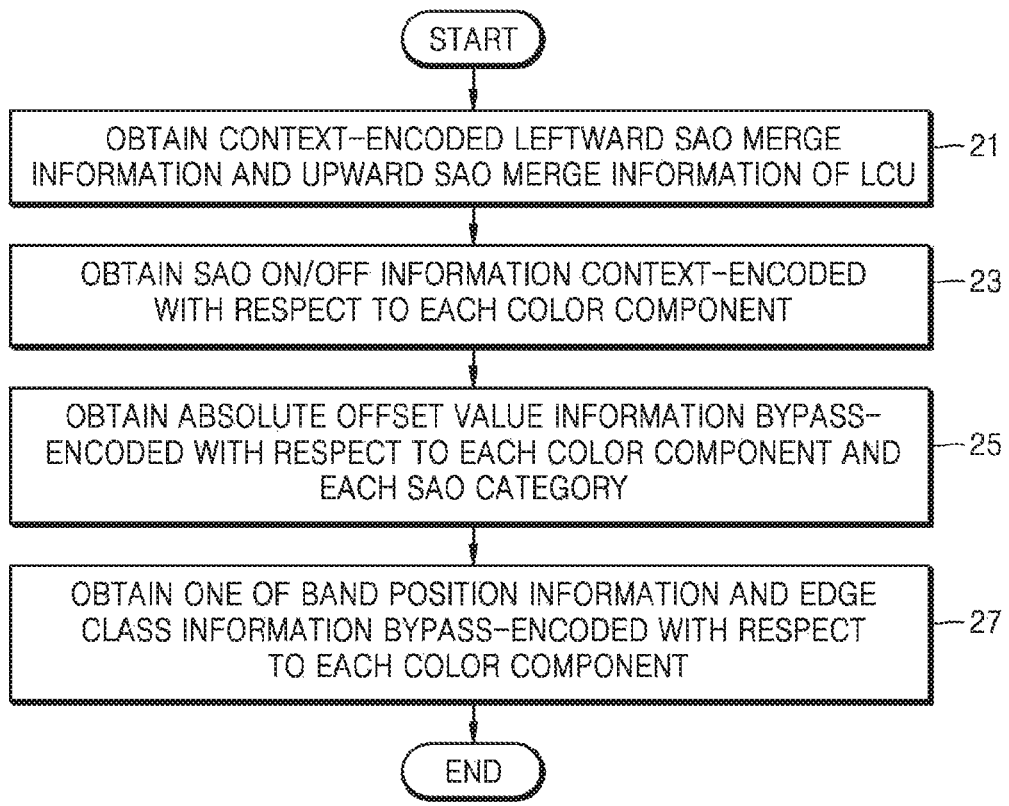

FIGS. 2A and 2B respectively illustrate a block diagram of an SAO decoding apparatus 20 and a flowchart of an SAO decoding method, according to exemplary embodiments of the present disclosure.

The SAO decoding apparatus 20 includes an entropy decoder 22 and an SAO operator 28. The entropy decoder 22 includes an SAO context decoder 24 and an SAO bypass decoder 26.

The SAO decoding apparatus 20 receives a bitstream including encoded data of a video. The SAO decoding apparatus 20 may parse encoded video samples from the received bitstream, and may perform entropy decoding, inverse quantization, inverse transformation, prediction, and motion compensation on each image block to generate reconstructed pixels.

The SAO decoding apparatus 20 may reconstruct a current slice by decoding encoded symbols including encoded samples and encoded information of the current slice, which are obtained from the received bitstream. Thus, a reconstructed image may be generated.

Also, the SAO decoding apparatus 20 may receive offset values indicating difference values between original pixels and reconstructed pixels, and the SAO operator 28 may minimize an error between an original image and the reconstructed image. The SAO decoding apparatus 20 may receive encoded data of each MCU of the video, and may reconstruct the MCU based on coding units split from the MCU and having a tree structure. The SAO operator 28 may perform an SAO operation on the MCU.

When the SAO decoding apparatus 20 performs SAO operation, initially, SAO parameters determined by the SAO encoding apparatus 10 that has performed SAO operation are required. The entropy decoder 22 may obtain the SAO parameters from a bitstream of the MCU. The SAO context decoder 24 may obtain leftward SAO merge information, and upward SAO merge information, and SAO on/off information with respect to each color component from the bitstream of the MCU.

If the SAO on/off information indicates to perform SAO operation, the SAO bypass decoder 26 may obtain edge band identification information with respect to each color component, and absolute offset value information and band position information or edge class information for each SAO category from the bitstream.

As such, if the SAO on/off information indicates to perform an SAO operation, the SAO operator 28 may adjust the reconstructed values of the MCU based on the absolute offset value information with respect to each SAO category, by using the information obtained by the SAO context decoder 24 and the SAO bypass decoder 26.

A method of reconstructing samples of a current MCU and obtaining SAO parameters for adjusting offsets will now be described in detail with reference to FIG. 2B.

The SAO decoding apparatus 20 may perform arithmetic decoding on symbols of each MCU by using a code probability model of each symbol. Furthermore, the SAO decoding apparatus 20 may perform context-based arithmetic decoding (hereinafter referred to as 'context decoding') based on an updated probability model with respect to each MCU.

Also, the SAO decoding apparatus 20 may perform bypass-mode entropy decoding (hereinafter referred to as 'bypass decoding') for performing arithmetic decoding without determining a probability model in consideration of context.

In operation 21, the SAO context decoder 24 may obtain context-encoded leftward SAO merge information and upward SAO merge information from a bitstream of an MCU.

The SAO context decoder 24 may determine a context-based probability model of the leftward SAO merge information, may perform entropy decoding by using the probability model of the leftward SAO merge information, and thus may reconstruct the leftward SAO merge information.

The SAO context decoder 24 may determine a context-based probability model of the upward SAO merge information, may perform entropy decoding by using the probability model of the upward SAO merge information, and thus may reconstruct the upward SAO merge information.

If the leftward SAO merge information indicates to predict SAO parameters of a current MCU by using the SAO parameters of a left MCU, the SAO parameters with respect to each color component of the left MCU may be adopted as the SAO parameters with respect to each color component of the current MCU.

If the leftward SAO merge information indicates not to use the SAO parameters of the left MCU and the upward SAO merge information indicates to predict the SAO parameters of the current MCU by using the SAO parameters of an upper MCU, the SAO parameters with respect to each color component of the upper MCU may be adopted as the SAO parameters with respect to each color component of the current MCU.

However, if the upward SAO merge information indicates not to predict the SAO parameters of the current MCU by using the SAO parameters of the upper MCU, the entropy decoder 22 may obtain the SAO parameters with respect to each color component of the current MCU from the bitstream.

In operation 23, the SAO context decoder 24 may obtain context-encoded SAO on/off information with respect to each color component from the bitstream of the MCU.

If the SAO on/off information indicates to perform SAO operation, the SAO bypass decoder 26 may further obtain bypass-encoded edge band identification information with respect to each color component from the bitstream of the MCU.

The SAO context decoder 24 may determine a context-based probability model of the SAO on/off information, may perform entropy decoding by using the probability model of the SAO on/off information, and thus may reconstruct the SAO on/off information.

The SAO on/off information for a first chroma component may be equally applied to a second chroma component. Accordingly, if the SAO on/off information for each of a luma component and the first chroma component is obtained, the SAO context decoder 24 may not further obtain the SAO on/off information for the second chroma component.

The edge band identification information for the first chroma component may be equally applied to the second chroma component. Accordingly, if the edge band identification information for each of the luma component and the first chroma component is obtained, the SAO bypass decoder 26 may not further obtain the edge band identification information for the second chroma component.

If the SAO on/off information obtained in operation 23 indicates to perform SAO operation, in operation 25, the SAO bypass decoder 26 may obtain bypass-encoded absolute offset value information for each SAO category and each color component from the bitstream of the MCU.

The SAO bypass decoder 26 may perform entropy decoding without using a context-based probability model of the absolute offset value information and thus may reconstruct the absolute offset value information.

In operation 27, the SAO bypass decoder 26 may obtain one of bypass-encoded band position information and edge class information with respect to each color component from the bitstream of the MCU.

If the edge band identification information indicates a band type, the SAO bypass decoder 26 may obtain bypass-encoded band position information with respect to each color component from the bitstream. If the absolute offset value information obtained for each SAO category is not 0, the SAO bypass decoder 26 may obtain bypass-encoded offset sign information and band position information with respect to each color component from the bitstream. The SAO bypass decoder 26 may lastly obtain the band position information from among the SAO parameters of the MCU.

If the edge band identification information indicates an edge type, the SAO bypass decoder 26 may obtain bypass-encoded edge class information with respect to each color component from the bitstream. The edge class information may include edge class information for the luma component and edge class information for the first chroma component. The edge class information for the first chroma component may be equally applied to the second chroma component. If the edge class information for each of the luma component and the first chroma component is obtained, the SAO bypass decoder 26 may not further obtain the edge class information for the second chroma component.

The SAO bypass decoder 26 may perform entropy decoding without using a context-based probability model of the offset sign information and thus may reconstruct the offset sign information. The SAO bypass decoder 26 may perform entropy decoding without using a context-based probability model of the band position information and thus may reconstruct the band position information. The SAO bypass decoder 26 may perform entropy decoding without using a context-based probability model of the edge class information and thus may reconstruct the edge class information.

The SAO operator 28 may determine the SAO parameters of the current MCU by using the SAO parameters of a left or upper MCU based on SAO merge information. In this case, the SAO parameters of the current MCU may not be extracted but may be reconstructed to be the same as the SAO parameters of previously reconstructed adjacent MCUs.

The SAO context decoder 24 may extract common SAO merge information for the luma component and the first and second chroma components of the current MCU. The SAO context decoder 24 may determine whether to reconstruct the SAO parameters of the luma component and the SAO parameters of the first and second chroma components to be the same as the SAO parameters of an adjacent MCU, based on the common SAO merge information.

An off type, an edge type, or a band type may be determined based on SAO type information obtained by the entropy decoder 22.

If a first bin of the SAO type information, i.e., the SAO on/off information, is reconstructed by the SAO context decoder 24, whether to perform SAO operation on the current MCU may be determined based on the SAO on/off information. If an SAO type is an off type, it may be determined not to perform SAO operation on the current MCU. In this case, remaining SAO parameters of the current MCU may not necessarily be parsed.

The SAO bypass decoder 26 may determine an absolute offset value with respect to each color component and each category. Each offset value may be equal to or greater than a preset minimum value, and may be equal to or less than a preset maximum value.

If the SAO type information indicates a band type, a position of a band including pixel values of reconstructed pixels may be determined based on the band position information obtained by the SAO bypass decoder 26.

If the SAO type information indicates a band type and the absolute offset value is determined as 0, the SAO bypass decoder 26 does not reconstruct the offset sign information. If the absolute offset value is not 0, the SAO bypass decoder 26 may obtain the offset sign information, and may determine whether the offset value is a positive value or a negative value. Also, the SAO bypass decoder 26 may obtain the band position information after the offset sign information is obtained.

If the SAO type information indicates an edge type, based on the edge class information obtained by the SAO bypass decoder 26, an edge direction of reconstructed pixels included in the current MCU may be determined as 0°, 90°, 45°, or 135°.

The SAO operator 28 may determine whether the SAO type of the current MCU is an edge type or a band type, based on a second bit of luma SAO type information, and may perform edge SAO operation or band SAO operation on the luma component of the current MCU.

The SAO operator 28 may determine whether the SAO type of the current MCU is an edge type or a band type, based on a second bit of chroma SAO type information, and may perform edge SAO operation or band SAO operation on the first and second chroma components of the current MCU.

Also, if it is determined to perform edge SAO operation on the first and second chroma components of the current MCU, the SAO operator 28 may determine that the first and second chroma components of the current MCU have the same edge class, based on the chroma SAO type information.

The absolute offset value information from among the SAO parameters obtained by the SAO bypass decoder 26 may be restricted to a value equal to or less than a threshold value based on a bit depth of a video. The absolute offset value information may indicate a value within a range based on a bit depth of a video. For example, if the bit depth corresponds to 8 bits, the absolute offset value may be a value equal to or greater than 0 and equal to or less than 7. As another example, if the bit depth corresponds to 10 bits, the absolute offset value may be a value equal to or greater than 0 and equal to or less than 31.

Also, if a second bit of the SAO type information indicates to perform band SAO operation on the current MCU, the SAO bypass decoder 26 may perform bypass-mode CABAC decoding on bits having a fixed bit length and following the second bit of the SAO type information. The SAO bypass decoder 26 may obtain information about a left start point of bands from the last fixed-bit-length bits of the SAO type information with respect to each of the luma component and the chroma component.

Based on the edge band identification information reconstructed by the SAO bypass decoder 26, a pixel value classification method of the current MCU may be determined as an edge type or a band type.

The SAO operator 28 may adjust pixel values of reconstructed samples by difference values determined with respect to coding units split from the current MCU and having a tree structure.

The SAO decoding apparatus 20 may include a central processor (CPU) for collectively controlling the entropy decoder 22, the SAO context decoder 24, the SAO bypass decoder 26, and the SAO operator 28. Alternatively, the entropy decoder 22, the SAO context decoder 24, the SAO bypass decoder 26, and the SAO operator 28 may be driven by their individual processors that cooperatively operate to control the SAO decoding apparatus 20. Alternatively, an external processor outside the SAO decoding apparatus 20 may control the entropy decoder 22, the SAO context decoder 24, the SAO bypass decoder 26, and the SAO operator 28.

The SAO decoding apparatus 20 may include one or more memories for storing input and output data of the entropy decoder 22, the SAO context decoder 24, the SAO bypass decoder 26, and the SAO operator 28. The SAO decoding apparatus 20 may include a memory controller for managing data input and output to and from the memories.

In order to reconstruct a video by performing video decoding, the SAO decoding apparatus 20 may operate in association with an internal or external video decoding processor. The internal video decoding processor of the SAO decoding apparatus 20 may be an independent processor for performing a basic video decoding operation. Also, the SAO decoding apparatus 20, a central processing unit, or a graphic processing unit may include a video decoding processor module to perform a basic video decoding operation.

Figure 3:
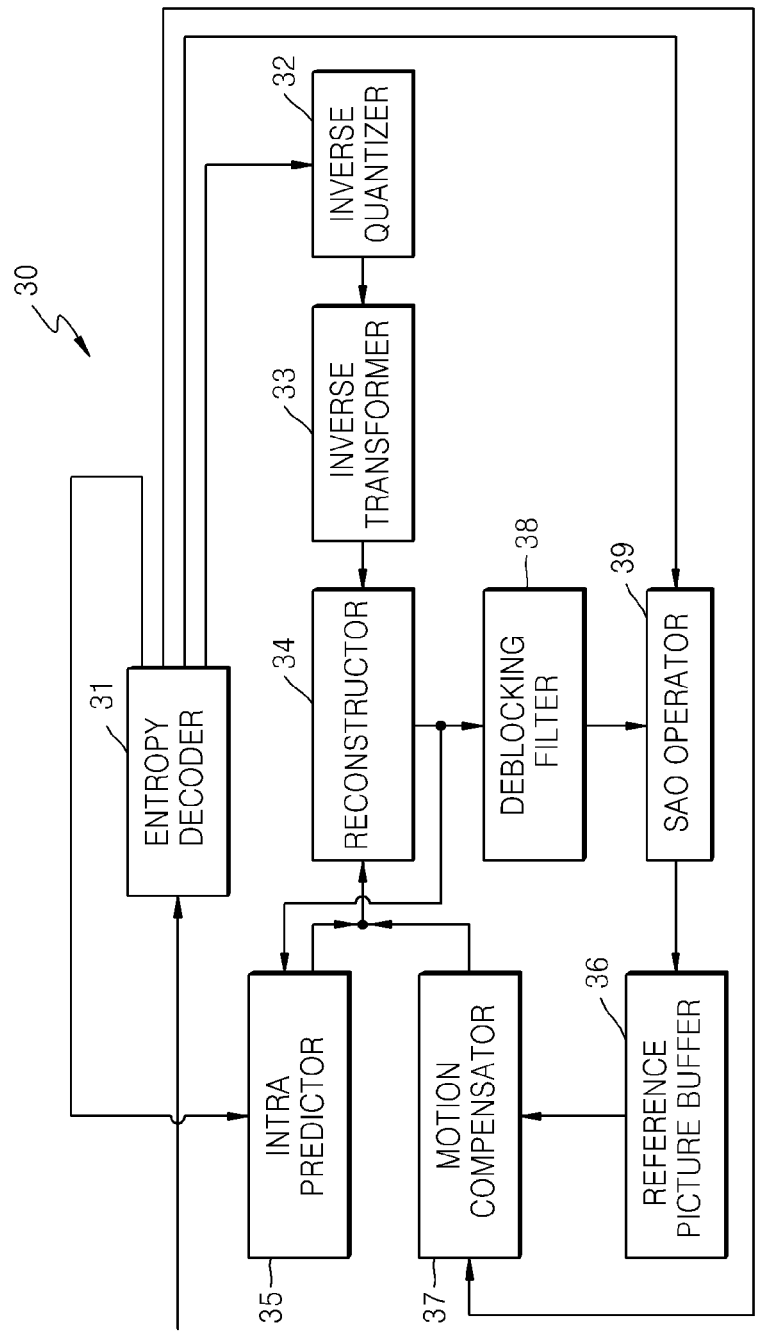
FIG. 3 illustrates a block diagram of a video decoding apparatus according to exemplary embodiments of the present disclosure.

A video decoding method using an SAO technique will now be described in detail with reference to FIG. 3. FIG. 3 illustrates a block diagram of a video decoding apparatus 30 according to an exemplary embodiment of the present disclosure.

The video decoding apparatus 30 includes an entropy decoder 31, an inverse quantizer 32, an inverse transformer 33, a reconstructor 34, an intra predictor 35, a reference picture buffer 36, a motion compensator 37, a deblocking filter 38, and an SAO operator 39.

The video decoding apparatus 30 may receive a bitstream including encoded video data. The entropy decoder 31 may parse intra mode information, inter mode information, SAO information, and residues from the bitstream.

The residues extracted by the entropy decoder 31 may be quantized transformation coefficients. Accordingly, the inverse quantizer 32 may perform inverse quantization on the residues to reconstruct transformation coefficients, and the inverse transformer 33 may perform inverse transformation on the reconstructed coefficients to reconstruct residual values of the space domain.

In order to predict and reconstruct the residual values of the space domain, intra prediction or motion compensation may be performed.

If the intra mode information is extracted by the entropy decoder 31, the intra predictor 35 may determine reference samples to be referred to reconstruct current samples from among samples spatially adjacent to the current samples, by using the intra mode information. The reference samples may be selected from among samples previously reconstructed by the reconstructor 34. The reconstructor 34 may reconstruct the current samples by using the reference samples determined based on the intra mode information and the residual values reconstructed by the inverse transformer 33.

If the inter mode information is extracted by the entropy decoder 31, the motion compensator 37 may determine a reference picture to be referenced to reconstruct current samples of a current picture from among pictures reconstructed previously to the current picture, by using the inter mode information. The inter mode information may include motion vectors, reference indices, etc. By using the reference indices, from among pictures reconstructed previously to the current picture and stored in the reference picture buffer 36, a reference picture to be used to perform motion compensation on the current samples may be determined. By using the motion vectors, a reference block of the reference picture to be used to perform motion compensation on a current block may be determined. The reconstructor 34 may reconstruct the current samples by using the reference block determined based on the inter mode information and the residual values reconstructed by the inverse transformer 33.

The reconstructor 34 may reconstruct samples and may output reconstructed pixels. The reconstructor 34 may generate reconstructed pixels of each MCU based on coding units having a tree structure.

The deblocking filter 38 may perform filtering for reducing a blocking phenomenon of pixels disposed at edge regions of the MCU or each of the coding units having a tree structure.

Also, the SAO operator 39 may adjust offsets of reconstructed pixels of each MCU according to an SAO technique. The SAO operator 39 may determine an SAO type, an SAO class, and offset values of a current MCU based on the SAO information extracted by the entropy decoder 31.

An operation of extracting the SAO information by the entropy decoder 31 may correspond to an operation of the SAO parameter extractor 22 of the SAO decoding apparatus 20, and operations of the SAO operator 39 may correspond to operations of the SAO determiner 24 and the SAO operator 26 of the SAO decoding apparatus 20.

The SAO operator 39 may determine signs and difference values of the offset values with respect to the reconstructed pixels of the current MCU based on the offset values determined from the SAO information. The SAO operator 39 may reduce errors between the reconstructed pixels and original pixels by increasing or reducing pixel values of the reconstructed pixels by the difference values determined based on the offset values.

A picture including the reconstructed pixels offset-adjusted by the SAO operator 39 may be stored in the reference picture buffer 36. Thus, by using a reference picture having minimized errors between reconstructed samples and original pixels according to an SAO operation, motion compensation may be performed on a next picture.

According to the SAO operation, based on difference values between reconstructed pixels and original pixels, an offset of a pixel group including the reconstructed pixels may be determined. For the SAO operation, exemplary embodiments for classifying reconstructed pixels into pixel groups will now be described in detail.

According to an SAO operation, pixels may be classified (i) based on an edge type of reconstructed pixels, or (ii) a band type of reconstructed pixels. Whether pixels are classified based on an edge type or a band type may be defined by using an SAO type.

Exemplary embodiments of classifying pixels based on an edge type according to an SAO operation will now be described in detail.

When edge-type offsets of a current MCU are determined, an edge class of each of reconstructed pixels included in the current MCU may be determined. In other words, by comparing pixel values of current reconstructed pixels and adjacent pixels, an edge class of the current reconstructed pixels may be defined. An example of determining an edge class will now be described with reference to FIG. 4.

FIG. 4 illustrates a table showing edge classes of edge types, according to exemplary embodiments of the present disclosure.

Indices 0, 1, 2, and 3 may be sequentially allocated to edge classes 41, 42, 43, and 44. If an edge type frequently occurs, a small index may be allocated to the edge type.

An edge class may indicate a direction of 1-dimensional edges formed between a current reconstructed pixel X0 and two adjacent pixels. The edge class 41 having the index 0 indicates a case when edges are formed between the current reconstructed pixel X0 and two horizontally adjacent pixels X1 and X2. The edge class 42 having the index 1 indicates a case when edges are formed between the current reconstructed pixel X0 and two vertically adjacent pixels X3 and X4. The edge class 43 having the index 2 indicates a case when edges are formed between the current reconstructed pixel X0 and two 135°-diagonally adjacent pixels X5 and X8. The edge class 44 having the index 3 indicates a case when edges are formed between the current reconstructed pixel X0 and two 45°-diagonally adjacent pixels X6 and X7.

Accordingly, by analyzing edge directions of reconstructed pixels included in a current MCU and thus determining a strong edge direction in the current MCU, an edge class of the current MCU may be determined.

With respect to each edge class, categories may be classified according to an edge shape of a current pixel. An example of categories according to edge shapes will now be described with reference to FIGS. 5A and 5B.

Figure 5B:
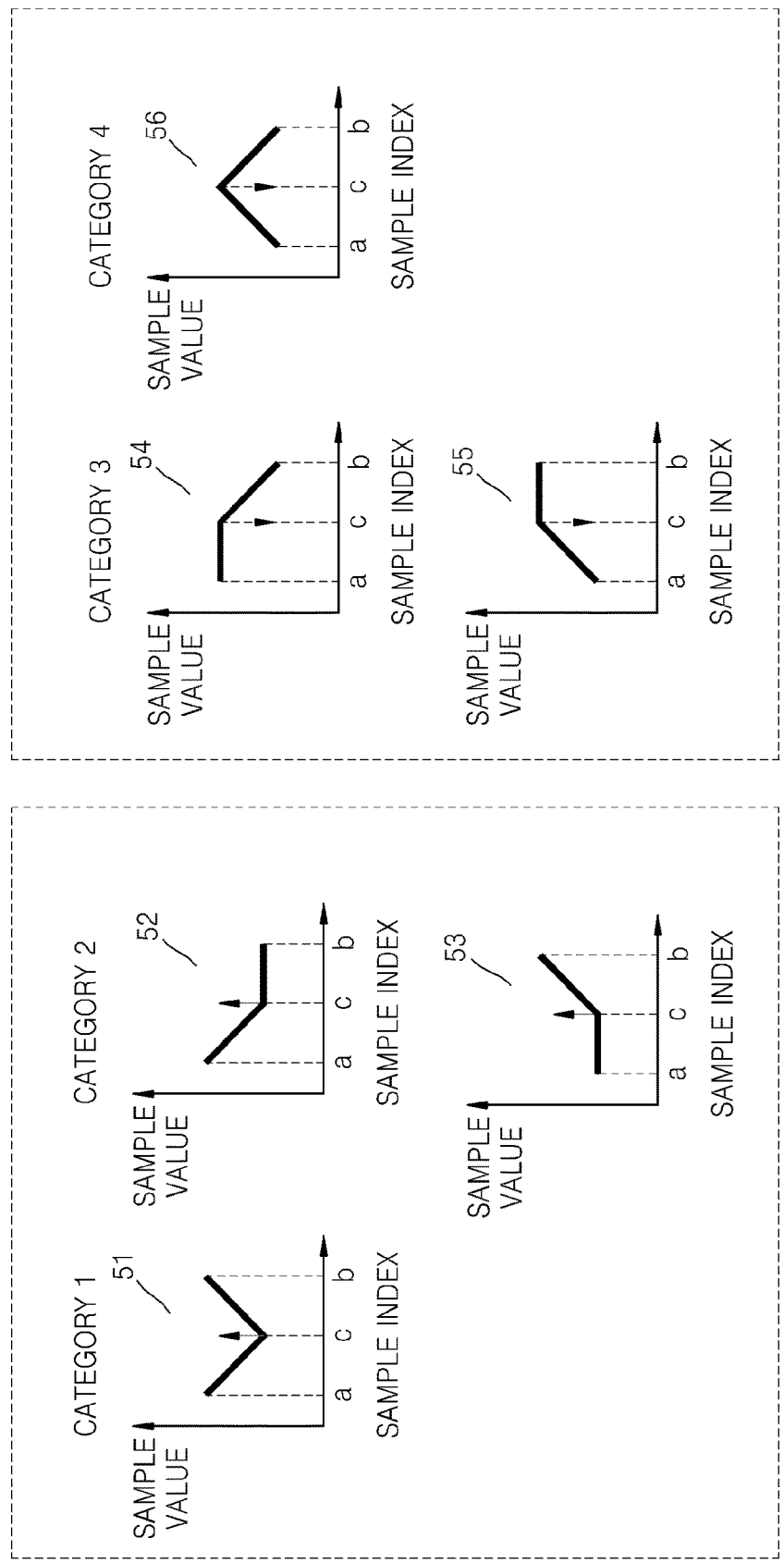

FIGS. 5A and 5B respectively illustrate a table and a graph showing categories of edge types, according to exemplary embodiments of the present disclosure.

An edge category indicates whether a current pixel corresponds to a lowest point of a concave edge, a pixel disposed at a curved corner around a lowest point of a concave edge, a highest point of a convex edge, or a pixel disposed at a curved corner around a highest point of a convex edge.

FIG. 5A illustrates conditions for determining categories of edges. FIG. 5B illustrates edge shapes between a reconstructed pixel and adjacent pixels and their pixel values c, a, and b.

With reference to FIGS. 5A and 5B, c indicates an index of a current reconstructed pixel, and a and b indicate indices of adjacent pixels at two sides of the current reconstructed pixel according to an edge direction. Xa, Xb, and Xc respectively indicate pixel values of reconstructed pixels having the indices a, b, and c. In FIG. 5B, an x axis indicates indices of the current reconstructed pixel and the adjacent pixels at two sides of the current reconstructed pixel, and a y axis indicates pixel values of samples.

Category 1 indicates a case when a current sample corresponds to a lowest point of a concave edge, i.e., a local valley (Xc<Xa && Xc<Xb). As shown in graph 51, if the current reconstructed pixel c between the adjacent pixels a and b corresponds to a lowest point of a concave edge, the current reconstructed pixel may be classified as the category 1.

Category 2 indicates a case when a current sample is disposed at a curved corner around a lowest point of a concave edge, i.e., a concave corner (Xc<Xa && Xc==Xb||Xc==Xa && Xc<Xb). As shown in graph 52, if the current reconstructed pixel c between the adjacent pixels a and b is disposed at an end point of a downward curve of a concave edge (Xc<Xa && Xc==Xb) or, as shown in graph 53, if the current reconstructed pixel c is disposed at a start point of an upward curve of a concave edge (Xc==Xa && Xc<Xb), the current reconstructed pixel may be classified as the category 2.

Category 3 indicates a case when a current sample is disposed at a curved corner around a highest point of a convex edge, i.e., a convex corner (Xc>Xa && Xc==Xb||Xc==Xa && Xc>Xb). As shown in graph 54, if the current reconstructed pixel c between the adjacent pixels a and b is disposed at a start point of a downward curve of a convex edge (Xc==Xa && Xc>Xb) or, as shown in graph 55, if the current reconstructed pixel c is disposed at an end point of an upward curve of a convex edge (Xc>Xa && Xc==Xb), the current reconstructed pixel may be classified as the category 3.

Category 4 indicates a case when a current sample corresponds to a highest point of a convex edge, i.e., a local peak (Xc>Xa && Xc>Xb). As shown in graph 56, if the current reconstructed pixel c between the adjacent pixels a and b corresponds to a highest point of a convex edge, the current reconstructed pixel may be classified as the category 4.

If the current reconstructed pixel does not satisfy any of the conditions of the categories 1, 2, 3, and 4, the current reconstructed pixel does not correspond to an edge and thus is classified as category 0, and an offset of category 0 may not be encoded.

According to exemplary embodiments of the present disclosure, with respect to reconstructed pixels corresponding to the same category, an average value of difference values between the reconstructed pixels and original pixels may be determined as an offset of a current category. Also, offsets of all categories may be determined.

The concave edges of the categories 1 and 2 may be smoothed if reconstructed pixel values are adjusted by using positive offset values, and may be sharpened due to negative offset values. The convex edges of the categories 3 and 4 may be smoothed due to negative offset values and may be sharpened due to positive offset values.

The SAO encoding apparatus 10 may not allow the sharpening effect of edges. Here, the concave edges of the categories 1 and 2 need positive offset values, and the convex edges of the categories 3 and 4 need negative offset values. In this case, if a category of an edge is known, a sign of an offset value may be determined. Accordingly, the SAO encoding apparatus 10 may not transmit the sign of the offset value and may transmit only an absolute value of the offset value. Also, the SAO decoding apparatus 20 may not receive the sign of the offset value and may receive only an absolute value of the offset value.

Accordingly, the SAO encoding apparatus 10 may encode and transmit offset values according to categories of a current edge class, and the SAO decoding apparatus 20 may adjust reconstructed pixels of the categories by the received offset values.

For example, if an offset value of an edge type is determined as 0, the SAO encoding apparatus 10 may transmit only edge class information.

For example, if an absolute offset value of an edge type is not 0, the SAO encoding apparatus 10 may transmit the absolute offset value and edge class information. With respect to the edge type, a sign of the offset value does may not be transmitted.

If the received absolute offset value is not 0, the SAO decoding apparatus 20 may read the absolute offset value of the edge type. The sign of the offset value may be predicted according to an edge category based on an edge shape between a reconstructed pixel and adjacent pixels.

Accordingly, the SAO encoding apparatus 10 may classify pixels according to edge directions and edge shapes, may determine an average error value between pixels having characteristics that are the same as characteristics of an offset value, and may determine offset values according to categories. The SAO encoding apparatus 10 may encode and transmit SAO type information indicating an edge type, SAO class information indicating an edge direction, and the offset values.

The SAO decoding apparatus 20 may receive the SAO type information, the SAO class information, and the offset values, and may determine an edge direction according to the SAO type information and the SAO class information. The SAO decoding apparatus 20 may determine an offset value of reconstructed pixels of a category corresponding to an edge shape according to the edge direction, and may adjust pixel values of the reconstructed pixels by the offset value, thereby minimizing an error between an original image and a reconstructed image.

Exemplary embodiments of classifying pixels based on a band type according to an SAO technique will now be described in detail.

According to exemplary embodiments of the present disclosure, each of pixel values of reconstructed pixels may belong to one of a plurality of bands. For example, the pixel values may have a total range from a minimum value Min of 0 to a maximum value Max of $2^{(p-1)}$ according to p-bit sampling. If the total range (Min, Max) of the pixel values is divided into K periods, each period of the pixel values is referred to as a band. If $B_k$ indicates a maximum value of a kth band, bands $[B_0, B_1-1]$, $[B_1, B_2-1]$, $[B_2, B_3-1]$, . . . , and $[B_k-1, B_k]$ may be divided. If a pixel value of a current reconstructed pixel Rec(x,y) belongs to the band $[B_k-1, B_k]$, a current band may be determined as k. The bands may be evenly or unevenly divided.

For example, if pixel values are classified into equal 8-bit pixel bands, the pixel values may be divided into 32 bands. In more detail, they may be classified into bands [0, 7], [8, 15], . . . , [240, 247], and [248, 255].

From among a plurality of bands classified according to a band type, a band to which each of pixel values of reconstructed pixels belongs may be determined. Also, an offset value indicating an average of errors between original pixels and reconstructed pixels in each band may be determined.

Accordingly, the SAO encoding apparatus 10 and the SAO decoding apparatus 20 may encode and transceive an offset corresponding to each of bands classified according to a current band type, and may adjust reconstructed pixels by the offset.

Accordingly, with respect to a band type, the SAO encoding apparatus 10 and the SAO decoding apparatus 20 may classify reconstructed pixels according to bands to which their pixel values belong, may determine an offset as an average of error values of reconstructed pixels that belong to the same band, and may adjust the reconstructed pixels by the offset, thereby minimizing an error between an original image and a reconstructed image.

When an offset according to a band type is determined, the SAO encoding apparatus 10 and the SAO decoding apparatus 20 may classify reconstructed pixels into categories according to a band position. For example, if the total range of the pixel values is divided into K bands, categories may be indexed according to a band index k indicating a $k^{th}$ band. The number of categories may be determined to correspond to the number of bands.

However, in order to reduce data, the SAO encoding apparatus 10 and the SAO decoding apparatus 20 may restrict the number of categories used to determine offsets according to an SAO technique. For example, a predetermined number of bands that are continuous from a band having a predetermined start position in a direction in which a band index is increased may be allocated to categories, and only an offset of each category may be determined.

For example, if a band having an index of 12 is determined as a start band, four bands from the start band, i.e., bands having indices of 12, 13, 14, and 15 may be respectively allocated to categories 1, 2, 3, and 4. Accordingly, an average error between reconstructed pixels and original pixels included in a band having the index of 12 may be determined as an offset of category 1. Likewise, an average error between reconstructed pixels and original pixels included in a band having the index of 13 may be determined as an offset of category 2, an average error between reconstructed pixels and original pixels included in a band having the index of 14 may be determined as an offset of category 3, and an average error between reconstructed pixels and original pixels included in a band having the index of 15 may be determined as an offset of category 4.

In this case, information about a start position of a band range, i.e., the position of a left band, is required to determine positions of bands allocated to categories. Accordingly, the SAO encoding apparatus 10 may encode and transmit left start point information indicating the position of the left band, as the SAO class. The SAO encoding apparatus 10 may encode and transmit an SAO type indicating a band type, an SAO class, and offset values according to categories.

The SAO decoding apparatus 20 may receive the SAO type, the SAO class, and the offset values according to the categories. If the received SAO type is a band type, the SAO decoding apparatus 20 may read a start band position from the SAO class. The SAO decoding apparatus 20 may determine a band to which reconstructed pixels belong, from among four bands from the start band, may determine an offset value allocated to a current band from among the offset values according to the categories, and may adjust pixel values of the reconstructed pixels by the offset value.

Hereinabove, an edge type and a band type are introduced as SAO types, and an SAO class and a category according to the SAO type are described in detail. SAO parameters encoded and transceived by the SAO encoding apparatus 10 and the SAO decoding apparatus 20 will now be described in detail.

The SAO encoding apparatus 10 and the SAO decoding apparatus 20 may determine an SAO type according to a pixel classification method of reconstructed pixels of each MCU.

The SAO type may be determined according to image characteristics of each block. For example, with respect to an MCU including a vertical edge, a horizontal edge, and a diagonal edge, in order to change edge values, offset values may be determined by classifying pixel values according to an edge type. With respect to an MCU not including an edge region, offset values may be determined according to band classification. Accordingly, the SAO encoding apparatus 10 and the SAO decoding apparatus 20 may signal the SAO type with respect to each MCU.

The SAO encoding apparatus 10 and the SAO decoding apparatus 20 may determine SAO parameters with respect to each MCU. In other words, SAO types of reconstructed pixels of an MCU may be determined, the reconstructed pixels of the MCU may be classified into categories, and offset values may be determined according to the categories.

From among the reconstructed pixels included in the MCU, the SAO encoding apparatus 10 may determine an average error of reconstructed pixels classified into the same category, as an offset value. An offset value of each category may be determined.

According to exemplary embodiments of the present disclosure, the SAO parameters may include an SAO type, offset values, and an SAO class. The SAO encoding apparatus 10 and the SAO decoding apparatus 20 may transceive the SAO parameters determined with respect to each MCU.

From among SAO parameters of an MCU, the SAO encoding apparatus 10 may encode and transmit the SAO type and the offset values. If the SAO type is an edge type, the SAO encoding apparatus 10 may further transmit an SAO class indicating an edge direction, which is followed by the SAO type and the offset values according to categories. If the SAO type is a band type, the SAO encoding apparatus 10 may further transmit an SAO class indicating a start band position, which is followed by the SAO type and the offset values according to categories. The SAO class may be classified as edge class information with respect to the edge type, and may be classified as band position information with respect to the band type.

The SAO decoding apparatus 20 may receive the SAO parameters of each MCU, which includes the SAO type, the offset values, and the SAO class. Also, the SAO decoding apparatus 20 may select an offset value of a category to which each reconstructed pixel belongs, from among the offset values according to categories, and may adjust the reconstructed pixel by the selected offset value.

Exemplary embodiments of transceiving offset values from among SAO parameters will now be described.

In order to transmit the offset values, the SAO encoding apparatus 10 may further transmit sign information and an absolute remainder.

If an absolute offset value is 0, the sign information or the absolute remainder may not be encoded. However, if the absolute offset value is not 0, the sign information and the absolute remainder may be further transmitted.

However, as described above, with respect to the edge type, because the offset value may be predicted as a positive number or a negative number according to a category, the sign information may not be transmitted.

According to exemplary embodiments of the present disclosure, an offset value Off-set may be previously restricted within a range from a minimum value MinOffset to a maximum value MaxOffset before the offset value is determined (MinOffset≤Off-Set≤MaxOffset).

For example, with respect to an edge type, offset values of reconstructed pixels of categories 1 and 2 may be determined within a range from a minimum value of 0 to a maximum value of 7. With respect to the edge type, offset values of reconstructed pixels of categories 3 and 4 may be determined within a range from a minimum value of −7 to a maximum value of 0.

For example, with respect to a band type, offset values of reconstructed pixels of all categories may be determined within a range from a minimum value of −7 to a maximum value of 7.

In order to reduce transmission bits of an offset value, a remainder may be restricted to a p-bit value instead of a negative number. In this case, the remainder may be greater than or equal to 0 and may be less than or equal to a difference value between the maximum value and the minimum value (0≤Remainder≤MaxOffset−MinOffset+1≤2^p). If the SAO encoding apparatus 10 transmits the remainder and the SAO decoding apparatus 20 is able to determine at least one of the maximum value and the minimum value of the offset value, an original offset value may be reconstructed by using only the received remainder.

From among SAO parameters, SAO merge information will now be described in detail.

SAO types and/or offset values of adjacent blocks may be the same. The SAO encoding apparatus 10 may compare SAO parameters of a current block to SAO parameters of adjacent blocks and may merge and encode the SAO parameters of the current block and the adjacent blocks if the SAO parameters are the same. If the SAO parameters of the adjacent block are previously encoded, the SAO parameters of the adjacent block may be adopted as the SAO parameters of the current block. Accordingly, the SAO encoding apparatus 10 may not encode the SAO parameters of the current block and may encode only the SAO merge information of the current block.

Before the SAO parameters are parsed from a received bitstream, the SAO decoding apparatus 20 may initially parse the SAO merge information and may determine whether to parse the SAO parameters. The SAO decoding apparatus 20 may determine whether an adjacent block having SAO parameters, which are the same as SAO parameters of the current block, exists based on the SAO merge information.

For example, if an adjacent block having the same SAO parameters exists based on the SAO merge information, the SAO decoding apparatus 20 may not parse the SAO parameters of the current block and may adopt reconstructed SAO parameters of the adjacent block as the SAO parameters of the current block. Accordingly, the SAO decoding apparatus 20 may reconstruct the SAO parameters of the current block to be the same as those SAO parameters of the adjacent block. Also, based on the SAO merge information, an adjacent block having SAO parameters to be referenced may be determined.

For example, if the SAO parameters of the adjacent blocks are different from the SAO parameters of the current block based on the SAO merge information, the SAO decoding apparatus 20 may parse and reconstruct the SAO parameters of the current block from the bitstream.

FIG. 6A illustrates a diagram showing adjacent MCUs referred to merge SAO parameters, according to exemplary embodiments of the present disclosure.

The SAO encoding apparatus 10 may determine a candidate list of adjacent MCUs to be referenced to predict SAO parameters of a current MCU 651 from among adjacent MCUs reconstructed prior to the current MCU 651. The SAO encoding apparatus 10 may compare SAO parameters of the current MCU 651 and the adjacent MCUs in the candidate list.

For example, simply, left and upper MCUs 653 and 652 of the current MCU 651 in a current picture 65 may be included in the candidate list.

Accordingly, the SAO encoding apparatus 10 may compare SAO parameters of the adjacent MCUs included in the candidate list to those of the current MCU 651 according to a reference order. For example, the SAO parameters may be compared to those of the current MCU 651 in the order of the left MCU 653 and the upper MCU 652. From among the compared left and upper MCUs 653 and 652, an MCU having SAO parameters that are the same as SAO parameters of the current MCU 651 may be determined as a reference MCU.

In order to predict the SAO parameters of the current MCU 651, the SAO encoding apparatus 10 and the SAO decoding apparatus 20 may refer to the same adjacent MCUs. Also, SAO merge information indicating an MCU having SAO parameters to be referred to may be transceived. The SAO decoding apparatus 20 may select one of the adjacent MCUs based on the SAO merge information, and may reconstruct the SAO parameters of the current MCU 651 to be the same as those SAO parameters of the selected adjacent MCU.

For example, it is assumed that the left and upper MCUs 653 and 652 are referenced. The entropy encoder 14 may encode leftward SAO merge information indicating whether the SAO parameters of the left MCU 653 of the current MCU 651 are the same as those of the current MCU 651, and upward SAO merge information indicating whether the SAO parameters of the upper MCU 652 are the same as SAO parameters of the current MCU 651, as the SAO merge information. In this case, the SAO parameters of the current MCU 651 and the left MCU 653 may be initially compared to determine whether the SAO parameters are the same, and then the SAO parameters of the current MCU 651 and the upper MCU 652 may be compared to determine whether the SAO parameters are the same. According to a comparison result, the SAO merge information may be determined.

If the SAO parameters of at least one of the left and upper MCUs 653 and 652 are the same as SAO parameters of the current MCU 651, the entropy encoder 14 may encode only the leftward SAO merge information and the upward SAO merge information, and may not encode the SAO parameters of the current MCU 651.

If the SAO parameters of both of the left and upper MCUs 653 and 652 are different from SAO parameters of the current MCU 651, the entropy encoder 14 may encode the leftward SAO merge information, the upward SAO merge information, and the SAO parameters of the current MCU 651.

SAO parameters according to color components will now be described in detail.

The SAO encoding apparatus 10 and the SAO decoding apparatus 20 may mutually predict SAO parameters between color components.

The SAO encoding apparatus 10 and the SAO decoding apparatus 20 may perform SAO operation on both luma blocks and chroma blocks in a YCrCb color format. Offset values of a luma component (Y component) and first and second chroma components (Cr and Cb components) of a current MCU may be determined.

According to an exemplary embodiment, common SAO merge information may be applied to a Y component, a Cr component, and a Cb component of the current MCU. In other words, based on one piece of SAO merge information, whether SAO parameters of the Y component are the same as SAO parameters of the Y component of an adjacent MCU may be determined, whether SAO parameters of the Cr component are the same as SAO parameters of the Cr component of the adjacent MCU may be determined, and whether SAO parameters of the Cb component are the same as SAO parameters of the Cb component of the adjacent MCU may be determined.

According to another exemplary embodiment, common SAO type information may be applied to the Cr and Cb components of the current MCU. In other words, based on one piece of SAO type information, it may be determined whether SAO operation is simultaneously (or non-simultaneously) performed on the Cr and Cb components. Also, based on one piece of SAO type information, it may be identified whether offset values of the Cr and Cb components are determined according to an edge type or a band type. If the SAO type is an edge type based on one piece of SAO type information, the Cr and Cb components may share the same edge direction.

In other words, based on one piece of SAO type information, whether offset values of the Cr and Cb components are determined according to an edge type or a band type may be identified.

Also, based on one piece of SAO type information, the Cr and Cb components may share the same SAO class. If the SAO type is an edge type based on one piece of SAO type information, the Cr and Cb components may share the same edge direction. If the SAO type is a band type based on one piece of SAO type information, the Cr and Cb components may share the same left band start position.

Syntax structures for defining SAO parameters of a current MCU will now be described in detail with reference to FIGS. 6B, and 7A through 7C.

FIG. 6B illustrates a diagram showing a process of performing entropy encoding on SAO parameters 60, according to another exemplary embodiment of the present disclosure.

Because SAO operation is performed on each color component of an MCU, the SAO parameters 60 of FIG. 6B may be individually obtained with respect to each color component. If a color index 'cldx' indicating a luma component, or a first or second chroma component varies, additional SAO parameters 60 may be obtained.

The SAO parameters 60 may include a parameter 'sao_merge_left_flag' indicating leftward SAO merge information, a parameter 'sao_merge_up_flag' indicating upward SAO merge information, a parameter 'sao_type_idx' indicating SAO type information, a parameter 'sao_band_position' indicating band position information of a band type, a parameter 'sao_offset_abs' indicating absolute offset value information, and a parameter 'sao_offset_sign' indicating offset sign information. Accordingly, whenever the color index 'cldx' is set as 0, 1, or 2, 'sao_merge_left_flag', 'sao_merge_up_flag', 'sao_type_idx', 'sao_band_position', 'sao_offset_abs', and 'sao_offset_sign' may be newly obtained.

In particular, the parameter 'sao_offset_abs' indicating the absolute offset value information, and a parameter 'sao_offset_sign' indicating the offset sign information may be additionally obtained with respect to four SAO categories. Accordingly, 'sao_offset_abs' and 'sao_offset_sign' may be obtained with respect to each of four categories and each color component.

Also, the SAO parameters 60 may have different entropy encoding methods. Context decoding or bypass decoding may be performed according to an entropy encoding method of an obtained parameter.

For example, one bin indicating the parameter 'sao_merge_left_flag' may be context-decoded, and one bin indicating the parameter 'sao_merge_up_flag' may be context-decoded. Six bins indicating the parameter 'sao_type_idx' may be context-decoded.

Also, five bins indicating the parameter 'sao_band_position' may be bypass-decoded. Thirty-one bins indicating the parameter 'sao_offset_abs' may be context-decoded, and one bin indicating the parameter 'sao_offset_sign' may be bypass-decoded.

Considering that parameters are individually obtained with respect to three color components and some parameters are individually obtained with respect to four SAO categories, up to 423 bins may be obtained according to Equation a.

$$3\times(1+1+6+5+4\times31+4\times1)=396+27=423 \qquad \text{<Equation a>}$$

In particular, from among 423 bins, 396 bins may be context-decoded, and 27 bins may be bypass-decoded. For context decoding, because each bin requires context-based probability modeling, the amount of calculation is large. Accordingly, if the number of context-decoded bins is larger than the number of bypass-decoded bins in a whole bitstream of the SAO parameters 60, the calculation and time for decoding all SAO parameters 60 are increased.

Also, the parameter 'sao_band_position' indicating the band position information should be bypass-decoded, the parameter 'sao_offset_abs' indicating the absolute offset value information should be context-decoded, and the parameter 'sao_offset_sign' indicating the offset sign information should be bypass-decoded. In particular, because an SAO category index is increased as 0, 1, 2, and 3, context decoding operations on the parameter 'sao_offset_abs' and bypass decoding operations on the parameter 'sao_offset_sign' should be alternately performed.

Alternate performing of different entropy decoding operations is inefficient in comparison to continuous performing of the same entropy decoding operation. Accordingly, if context decoding and bypass decoding operations are alternately performed a plurality of times on the parameters 'sao_band_position', 'sao_offset_abs', and 'sao_offset_sign' from among the SAO parameters 60, the efficiency of an overall entropy decoding operation may be reduced.

FIG. 7A illustrates SAO syntax 70 of a coding unit, according to exemplary embodiments of the present disclosure.

The SAO syntax 70 of FIG. 7A is a part of syntax of an MCU, which is related to SAO parameters. The SAO encoding apparatus 10 may determine the SAO parameters by performing SAO operation on samples of the MCU, and may perform entropy encoding on the SAO parameters. Also, the SAO encoding apparatus 10 may output a bitstream including bitstreams of the SAO parameters according to an order indicated by the SAO syntax 70.

The SAO decoding apparatus 20 may obtain the bitstreams of the SAO parameters by parsing the SAO syntax 70, and may reconstruct the SAO parameters by performing entropy decoding on the SAO parameters. The SAO decoding apparatus 20 may perform SAO operation on reconstructed samples of the MCU by using the reconstructed SAO parameters.

If a left MCU adjacent to a current MCU exists in a current slice, leftward SAO merge information 'sao_merge_left_flag' 71 may be obtained. Otherwise, if an upper MCU adjacent to the current MCU exists in the current slice and the SAO parameters of the left MCU are not merged, upward SAO merge information 'sao_merge_up_flag' 72 may be obtained.

The 'sao_merge_left_flag' 71 and the 'sao_merge_up_flag' 72 may be obtained regardless of color components, and thus may be commonly applied to a luma component and first and second chroma components. The same motion vector may be used to perform motion compensation on the three color components. Accordingly, because SAO merge information is obtained regardless of the color components, SAO operation using the leftward and upward SAO merge information and 72 may be efficiently unified with a codec for performing motion compensation.

SAO parameters other than the 'sao_merge_left_flag' 71 and the 'sao_merge_up_flag' 72 (741, 743, 751, 753, 77, 781, 782, 791, and 793) may be separated according to the color components, and thus may be obtained by designating the color index 'cldx' as 0, 1, and 2 (73).

If a current color index indicates a luma component (74), luma SAO on/off information 'sao_on_off_flag_luma' 741 may be obtained. If SAO operation is performed on the luma component, luma edge band identification information 'sao_eo_bo_flag_luma' 743 may be further obtained.

Otherwise, if the current color index is a first chroma component (75), chroma SAO on/off information 'sao_on_off_flag_chroma' 751 for first and second chroma components may be obtained. If SAO operation is performed on the first and second chroma components, chroma edge band identification information 'sao_eo_bo_flag_chroma' 753 may be further obtained. The 'sao_on_off_flag_chroma' 751 and the 'sao_eo_bo_flag_chroma' 753 may be obtained only when the color index indicates the first chroma component, and may not be obtained when the color index indicates the second chroma component.

SAO on/off information of SAO type information does not indicate 'off' (76), SAO class information and offset value information for each SAO category may be obtained. Due to a for loop statement according to an increase in T, absolute offset value information 'sao_offset_abs' 77, offset sign information 'sao_offset_sign' 781, and band position information 'sao_band_position' 783 may be individually obtained with respect to each SAO category.

Initially, if the absolute offset value information 'sao_offset_abs' 77 is obtained and the SAO type information indicates a band type (78), the band position information 'sao_band_position' 783 may be obtained. In particular, if the absolute offset value information 'sao_offset_abs' 77 is not 0, the offset sign information 'sao_offset_sign' 781 may be initially obtained and then the 'sao_band_position' 783 may be obtained.

When the SAO type information indicates an edge type (79), if the color index indicates the luma component, luma edge class information 'sao_eo_class_luma' 791 may be obtained. If the color index indicates the first chroma component, chroma edge class information 'sao_eo_class_chroma' 793 for the first and second chroma components may be obtained. If the color index indicates the second chroma component, the 'sao_eo_class_chroma' 793 may not be obtained.

If the SAO type information indicates an edge type, only the luma or chroma edge class information 791 or 793 may be obtained and offset sign information may not be obtained because a sign of an edge offset value may be determined according to an edge class.

As described above, the chroma SAO on/off information 'sao_on_off_flag_chroma' 751, the chroma edge band identification information 'sao_eo_bo_flag_chroma' 753, and the chroma edge class information 'sao_eo_class_chroma' 793 are parameters commonly applied to the first and second chroma components.

Accordingly, because the chroma SAO on/off information 'sao_on_off_flag_chroma' 751, the chroma edge band identification information 'sao_eo_bo_flag_chroma' 753, and the chroma edge class information 'sao_eo_class_chroma' 793 are commonly obtained with respect to the first and second chroma components, memory access for performing SAO operation on chroma components may be simplified. Also, because the same parameters are applied to the first and second chroma components in each of intra prediction, motion compensation, and adaptive loop filtering (ALF) performed on the first and second chroma components, parameters or samples for each operation may be obtained by accessing the same memory. Accordingly, SAO operation may be efficiently unified with a codec for performing intra prediction, motion compensation, and ALF.

Hereinabove, operations of the SAO decoding apparatus 20 for obtaining SAO parameters by parsing the SAO syntax 70 are sequentially described in detail. A process of performing entropy decoding on the obtained SAO parameters will now be described in detail.

The SAO decoding apparatus 20 may perform context decoding on the leftward SAO merge information 'sao_merge_left_flag' 71 and the upward SAO merge information 'sao_merge_up_flag' 72. Accordingly, a probability model based on context of a bin of the leftward SAO merge information 71 may be determined, and one bin value used to probabilistically generate the 1-bit leftward SAO merge information 71 may be reconstructed. The above-described context decoding may be similarly performed on the upward SAO merge information 72.

Unlike the SAO parameters 60 of FIG. 6B, the SAO decoding apparatus 20 may separately decode the SAO type information as the SAO on/off information 741 and 743, the edge band identification information 751 and 753, the offset sign information 781, the band position information 783, and the edge class information 791 and 793. The edge class information 791 and 793 may be obtained with respect to an edge type, and the offset sign information 781 and the band position information 783 may be obtained with respect to a band type.

Context decoding is performed for six bins of SAO type information 'sao_type_idx' of the SAO parameters 60 of FIG. 6B. On the other hand, the SAO decoding apparatus 20 may perform context decoding for one bin of the SAO on/off information 741 and 743, and may perform bypass decoding for remaining parameters.

For example, with respect to an edge type, the SAO decoding apparatus 20 may perform context decoding for one bin of the SAO on/off information 741 and 743, and may perform bypass decoding for one bin of the edge band identification information 751 or 753 and 2 bins of the edge class information 791 or 793.

Accordingly, considering that only some parameters are individually obtained with respect to three color components and four SAO categories, with respect to a band type, the SAO decoding apparatus 20 may obtain up to 405 bins according to Equation b.

$$1+1+2\times(1+1)+3\times(4\times31+4\times1+5)=4+401=405 \qquad \text{<Equation b>}$$

In particular, from among 405 bins, 4 bins may be context-decoded, and 401 bins may be bypass-decoded. In other words, the number of context decoding operations, which require a relatively large amount of calculation, is greatly less than the number of bypass decoding operations. Also, because some SAO parameters are obtained as the same parameter with respect to color components, the length of a whole bitstream of the SAO parameters may be reduced.

Accordingly, because the SAO decoding apparatus 20 performs bypass decoding on the edge band identification information 751 or 753, the absolute offset value information 77, and the band position information 783 or the edge class information 791 or 793, obtains the common SAO merge information 71 and 72 with respect to color components, and obtains the common SAO on/off information 741 or 743, the edge band identification information 751 or 753, and the edge class information 791 or 793 with respect to chroma components, the efficiency of an overall entropy decoding operation on the SAO parameters may be improved.

Also, unlike the SAO parameters 60 of FIG. 6B, the SAO decoding apparatus 20 may obtain the band position information 783 later than the absolute offset value information 77. As such, the SAO decoding apparatus 20 may perform context decoding on the SAO merge information 71 and 72, and the SAO on/off information 741 or 743, and may perform bypass decoding on the edge band identification information 751 or 753, the absolute offset value information 77, and the band position information 783 or the edge class information 791 or 793.

Accordingly, in comparison to the SAO parameters 60 of FIG. 6B, because the number of times that the SAO decoding apparatus 20 alternately performs context decoding and bypass decoding by using the SAO syntax 70 is reduced, the efficiency of an entropy decoding operation on the SAO parameters may be improved.

FIGS. 7B and 7C illustrate SAO syntax of a coding unit, according to other exemplary embodiments of the present disclosure.

The SAO syntax of FIG. 7B is designed to reduce the number of 'if statements' for checking a color index in the SAO syntax 70 of FIG. 7A, because the amount of calculation is increased if the number of if statements for checking a condition is increased.

In the SAO syntax of FIG. 7B, if statements for checking whether a current color index indicates a luma component or a first chroma component in order to obtain SAO on/off information 83 and 84 are not required. According to the SAO syntax of FIG. 7B, luma SAO on/off information 83, luma edge band identification information 831, and luma edge class information 833 for the luma component may be sequentially obtained, and then chroma SAO on/off information 84, chroma edge band identification information 841, and chroma edge class information 843 for first and second chroma components may be sequentially obtained.

Thus, according to the SAO syntax of FIG. 7B, in comparison to the SAO syntax 70 of FIG. 7A, because four if statements, for checking whether a current color index indicates a luma component or a first chroma component are deleted, the number of if statements may be reduced by 4.

In the SAO syntax of FIG. 7B, after the luma SAO on/off information 83, the luma edge band identification information 831, the luma edge class information 833, the chroma SAO on/off information 84, the chroma edge band identification information 841, and the chroma edge class information 842 are obtained, absolute offset value information 87 and offset sign information 881 may be obtained with respect to each color component and each category, and band position information 883 may be obtained with respect to each color component.

In this case, a context decoding operation is performed on the luma SAO on/off information 83, a bypass decoding operation is performed on the luma edge band identification information 831 and the luma edge class information 832, a context decoding operation is performed on the chroma SAO on/off information 84, and a bypass decoding operation is performed on the chroma edge band identification information 841 and the chroma edge class information 843. A bypass decoding operation may be performed on the absolute offset value information 87, the offset sign information 881, and the band position information 883.

Accordingly, in the SAO syntax of FIG. 7B, context decoding and bypass decoding operations are switched three times.

The SAO syntax of FIG. 7C is designed to reduce the number of times that context decoding and bypass decoding operations are switched in the SAO syntax 70 of FIG. 7B, in which the number of if statements for checking a color index in the SAO syntax 70 of FIG. 7A is reduced.

In the SAO syntax of FIG. 7C, the luma SAO on/off information 83 is obtained and then the chroma SAO on/off information 84 is obtained. After that, the luma edge band identification information 831 and the luma edge class information 832 may be obtained based on the luma SAO on/off information 83, and the chroma edge band identification information 841 and the chroma edge class information 842 may be obtained based on the chroma SAO on/off information 84.

Accordingly, a context decoding operation is performed on the luma SAO on/off information 83 and the chroma SAO on/off information 84, and a bypass decoding operation is performed on the luma edge band identification information 831, the luma edge class information 832, the chroma edge band identification information 841, and the chroma edge class information 842. Then, a bypass decoding operation may also be performed on the absolute offset value information 87, the offset sign information 881, and the band position information 883. Accordingly, in the SAO syntax of FIG. 7C, because entropy decoding methods are switched only one time from a context decoding operation to a bypass decoding operation and are not repeatedly performed, the efficiency of an overall entropy decoding operation may be improved.

According to the above-described exemplary embodiments, the SAO encoding apparatus 10 may perform bypass encoding on absolute offset value information for SAO operation. Also, SAO type information may be separated into SAO on/off information, edge band identification information, and band position information (or edge class information), and context encoding may be performed on only the SAO on/off information. Accordingly, from among SAO parameters, by reducing the number of parameters to be context-decoded and increasing the number of parameters to be bypass-decoded, the efficiency of an overall entropy encoding operation on the SAO parameters may be improved.

Also, from among SAO parameters, by using the same parameters as SAO on/off information, edge band identification information, and edge class information for first and second chroma components, and by using the same parameter as SAO merge information for luma, and first and second chroma components, a total transmission amount of the SAO parameters may be reduced.

Furthermore, by reducing the number of times that context encoding and bypass encoding operations are switched, the efficiency of an entropy encoding operation may also be improved.

In addition, from among SAO parameters, because the SAO decoding apparatus 20 may perform context decoding on only SAO merge information and SAO on/off information and may perform bypass decoding on a remaining bitstream, a total amount of calculation for decoding the SAO parameters may be greatly reduced.

Besides, because SAO on/off information, edge band identification information, and edge class information for first and second chroma components are obtained as the same parameters, and SAO merge information for luma, and first and second chroma components is obtained as the same parameter, a total bit length of SAO parameters may be reduced and the amount of data to be parsed may also be reduced.

Also, because the number of times that context decoding and bypass decoding operations are switched is reduced, the efficiency of an overall entropy decoding operation on the SAO parameters may be improved.

Accordingly, a video encoding apparatus and a video decoding apparatus using SAO operation, according to exemplary embodiments of the present disclosure, may classify pixel values of each MCU according to image characteristics, such as an edge type or a band type, may signal an offset value that is an average error value of pixel values having the same characteristics, and may adjust unpredictable pixel values of reconstructed pixels by the offset value, thereby minimizing an error between an original image and a reconstructed image.

In the SAO encoding apparatus 10 and the SAO decoding apparatus 20, as described above, video data may be split into MCUs, each MCU may be encoded and decoded based on coding units having a tree structure, and each MCU may determine offset values according to pixel classification. Hereinafter, a video encoding method, a video encoding apparatus, a video decoding method, and a video decoding apparatus based on coding units having a tree structure and transformation units will be described with reference to FIGS. 8 through 27.

Figure 8:
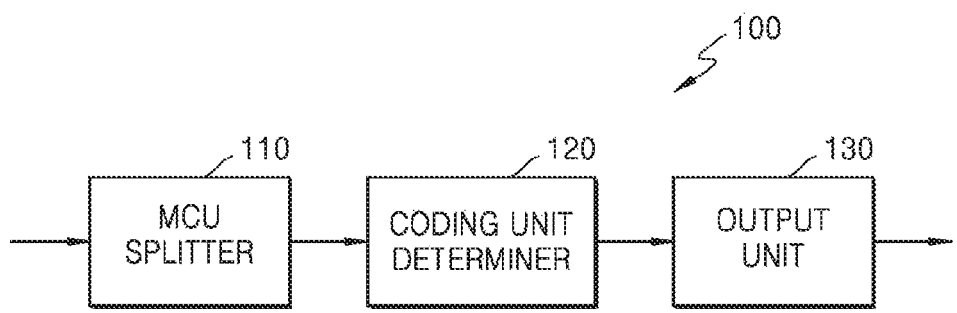
FIG. 8 illustrates a block diagram of a video encoding apparatus based on coding units having a tree structure, according to exemplary embodiments of the present disclosure.

FIG. 8 is a block diagram of a video encoding apparatus 100 based on coding units having a tree structure, according to exemplary embodiments of the present disclosure.

The video encoding apparatus 100 involving video prediction based on coding units having a tree structure includes a MCU splitter 110, a coding unit determiner 120, and an outputter 130.

The MCU splitter 110 may split a current picture based on a MCU that is a coding unit having a maximum size for a current picture of an image. If the current picture is larger than the MCU, image data of the current picture may be split into the at least one MCU. The MCU according to exemplary embodiments of the present disclosure may be a data unit having a size of 32×32, 64×64, 128×128, 256×256, etc., in which a shape of the data unit is a square having a width and length in squares of 2. The image data may be output to the coding unit determiner 120 according to the at least one MCU.

A coding unit according to exemplary embodiments of the present disclosure may be characterized by a maximum size and a depth. The depth denotes the number of times the coding unit is spatially split from the MCU, and as the depth deepens, deeper coding units according to depths may be split from the MCU to a smallest coding unit (SCU). A depth of the MCU is an uppermost depth and a depth of the SCU is a lowermost depth. Because a size of a coding unit corresponding to each depth decreases as the depth of the MCU deepens, a coding unit corresponding to an upper depth may include a plurality of coding units corresponding to lower depths.

As described above, the image data of the current picture is split into the MCUs according to a maximum size of the coding unit, and each of the MCUs may include deeper coding units that are split according to depths. Because the MCU according to exemplary embodiments of the present disclosure is split according to depths, the image data of the space domain included in the MCU may be hierarchically classified according to depths.

A maximum depth and a maximum size of a coding unit, which limit the total number of times a height and a width of the MCU are hierarchically split, may be predetermined.

The coding unit determiner 120 encodes at least one split region obtained by splitting a region of the MCU according to depths, and determines a depth to output a finally encoded image data according to the at least one split region. In other words, the coding unit determiner 120 determines a coded depth by encoding the image data in the deeper coding units according to depths, according to the MCU of the current picture, and selecting a depth having the smallest encoding error. The determined coded depth and the encoded image data according to the determined coded depth are output to the outputter 130.

The image data in the MCU is encoded based on the deeper coding units corresponding to at least one depth equal to or below the maximum depth, and results of encoding the image data are compared based on each of the deeper coding units. A depth having the smallest encoding error may be selected after comparing encoding errors of the deeper coding units. At least one coded depth may be selected for each MCU.

The size of the MCU is split as a coding unit is hierarchically split according to depths, and as the number of coding units increases. Also, even if coding units correspond to the same depth in one MCU, it is determined whether to split each of the coding units corresponding to the same depth to a lower depth by measuring an encoding error of the image data of the each coding unit, separately. Accordingly, even when image data is included in one MCU, the encoding errors may differ according to regions in the one MCU, and thus the coded depths may differ according to regions in the image data. Thus, one or more coded depths may be determined in one MCU, and the image data of the MCU may be divided according to coding units of at least one coded depth.

Accordingly, the coding unit determiner 120 may determine coding units having a tree structure included in the MCU. The 'coding units having a tree structure' according to exemplary embodiments of the present disclosure include coding units corresponding to a depth determined to be the coded depth, from among all deeper coding units included in the MCU. A coding unit of a coded depth may be hierarchically determined according to depths in the same region of the MCU, and may be independently determined in different regions. Similarly, a coded depth in a current region may be independently determined from a coded depth in another region.

A maximum depth according to exemplary embodiments of the present disclosure is an index related to the number of splitting times from a MCU to an SCU. A first maximum depth according to exemplary embodiments of the present disclosure may denote the total number of splitting times from the MCU to the SCU. A second maximum depth according to exemplary embodiments of the present disclosure may denote the total number of depth levels from the MCU to the SCU. For example, when a depth of the MCU is 0, a depth of a coding unit, in which the MCU is split once, may be set to 1, and a depth of a coding unit, in which the MCU is split twice, may be set to 2. Here, if the SCU is a coding unit in which the MCU is split four times, 5 depth levels of depths 0, 1, 2, 3, and 4 exist, and thus the first maximum depth may be set to 4, and the second maximum depth may be set to 5.

Prediction encoding and transformation may be performed according to the MCU. The prediction encoding and the transformation are also performed based on the deeper coding units according to a depth equal to or depths less than the maximum depth, according to the MCU.

Because the number of deeper coding units increases whenever the MCU is split according to depths, encoding, including the prediction encoding and the transformation, is performed on all of the deeper coding units generated as the depth deepens. For convenience of description, the prediction encoding and the transformation will now be described based on a coding unit of a current depth, in a MCU.

The video encoding apparatus 100 may select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit to perform the prediction encoding on the image data in the coding unit.

In order to perform prediction encoding in the MCU, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a smallest encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residues in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a smallest encoding error, but also determines a partition type in a prediction unit, a prediction mode according to prediction units, and a size of a transformation unit for transformation.

Coding units having a tree structure in a MCU and methods of determining a prediction unit/partition, and a transformation unit, according to exemplary embodiments of the present disclosure, will be described in detail below with reference to FIGS. 7 through 19.

The coding unit determiner 120 may measure an encoding error of deeper coding units according to depths by using Rate-Distortion Optimization based on Lagrangian multipliers.

The outputter 130 outputs the image data of the MCU, which is encoded based on the at least one coded depth determined by the coding unit determiner 120, and information about the encoding mode according to the coded depth, in bitstreams.

The encoded image data may be obtained by encoding residues of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Because at least one coding unit of the lower depth exists in one coding unit of the current depth, the encoding is repeatedly performed on each coding unit of the lower depth, and thus the encoding may be recursively performed for the coding units having the same depth.

Because the coding units having a tree structure are determined for one MCU, and information about at least one encoding mode is determined for a coding unit of a coded depth, information about at least one encoding mode may be determined for one MCU. Also, a coded depth of the image data of the MCU may be different according to locations because the image data is hierarchically split according to depths, and thus information about the coded depth and the encoding mode may be set for the image data.

Accordingly, the outputter 130 may assign encoding information about a corresponding coded depth and an encoding mode to at least one of the coding unit, the prediction unit, and a minimum unit included in the MCU.

The minimum coding unit according to exemplary embodiments of the present disclosure is a square data unit obtained by splitting the SCU constituting the lowermost depth by 4. Alternatively, the minimum coding unit according to exemplary embodiments may be a maximum square data unit that may be included in all of the coding units, prediction units, partition units, and transformation units included in the MCU.

For example, the encoding information output by the outputter 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The outputter 130 may encode and output SAO parameters related to the offset operation technique described above with reference to FIGS. 1A through 7C.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each MCU, based on the size of the MCU and the maximum depth determined considering characteristics of the current picture. Also, because encoding may be performed on each MCU by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100, image compression efficiency may be increased because a coding unit is adjusted while considering characteristics of an image while increasing a maximum size of a coding unit while considering a size of the image.

The video encoding apparatus 100 of FIG. 8 may perform operation of the SAO encoding apparatus 10 described above with reference to FIG. 1A.

The coding unit determiner 120 may perform operation of the SAO operator 12 of the SAO encoding apparatus 10. An SAO type, offset values according to categories, and an SAO class may be determined with respect to each MCU.

The outputter 130 may perform operation of the entropy encoder 14. SAO parameters determined with respect to each MCU may be output. Leftward and upward SAO merge information indicating whether to adopt SAO parameters of left and upper adjacent MCUs of a current MCU as the SAO parameters of the current MCU may be initially output. As an SAO type, an off type, an edge type, or a band type may be output. Absolute offset value information is output. With respect to the band type, sign information and band position information may be output. With respect to the edge type, edge class information may be output and the sign information of the offset value may not be output.

The outputter 130 may perform context encoding on each of the leftward SAO merge information and the upward SAO merge information of the MCU. The outputter 130 may perform context encoding on SAO on/off information with respect to each of luma and chroma components.

If the SAO on/off information indicates to perform SAO operation, the outputter 130 may perform bypass encoding on edge band identification information with respect to each of luma and chroma components.

If the SAO on/off information indicates to perform SAO operation, the outputter 130 may perform bypass encoding on absolute offset value information with respect to each of luma, and first and second chroma components and each SAO category. With respect to a band type, the outputter 130 may perform bypass encoding on offset sign information and band position information with respect to each of luma, and first and second chroma components. With respect to an edge type, the outputter 130 may perform bypass encoding on edge class information with respect to each of luma and chroma components.

The edge class information for the first chroma component may also be applied to the second chroma component, and the SAO on/off information and the edge band identification information for the first chroma component may also be applied to the second chroma component.

Figure 9:
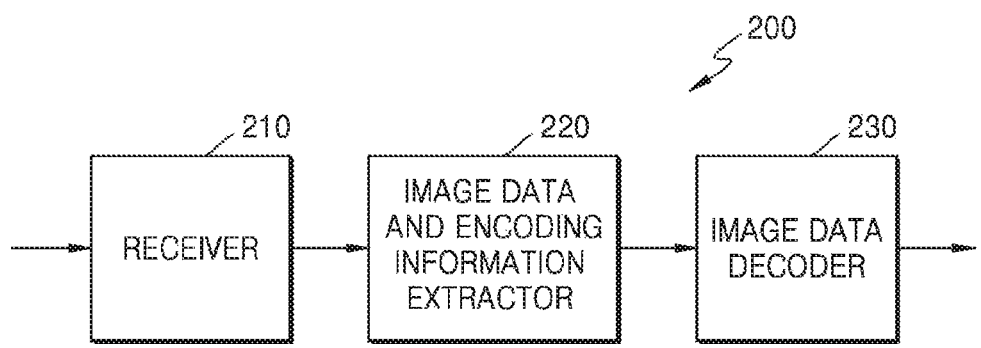
FIG. 9 illustrates a block diagram of a video decoding apparatus based on coding units having a tree structure, according to exemplary embodiments of the present disclosure.

FIG. 9 illustrates a block diagram of a video decoding apparatus 200 based on coding units having a tree structure, according to exemplary embodiments of the present disclosure.

The video decoding apparatus 200 that involves video prediction based on coding units having a tree structure includes a receiver 210, an image data and encoding information extractor 220, and an image data decoder 230.

Definitions of various terms, such as a coding unit, a depth, a prediction unit, a transformation unit, and information about various encoding modes, for decoding operations of the video decoding apparatus 200 are identical to those described with reference to FIG. 7 and the video encoding apparatus 100.

The receiver 210 receives and parses a bitstream of an encoded video. The image data and encoding information extractor 220 extracts encoded image data for each coding unit from the parsed bitstream, in which the coding units have a tree structure according to each MCU, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts information about a coded depth and an encoding mode for the coding units having a tree structure according to each MCU, from the parsed bitstream. The extracted information about the coded depth and the encoding mode is output to the image data decoder 230. In other words, the image data in a bit stream is split into the MCU so that the image data decoder 230 decodes the image data for each MCU.

The information about the coded depth and the encoding mode according to the MCU may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each MCU extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each MCU. Accordingly, the video decoding apparatus 200 may reconstruct an image by decoding the image data according to a coded depth and an encoding mode that generates the minimum encoding error.

Because encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and encoding mode of a corresponding MCU is recorded according to predetermined data units, the predetermined data units to which the same information about the coded depth and the encoding mode is assigned may be inferred to be the data units included in the same MCU.

The image data decoder 230 reconstructs the current picture by decoding the image data in each MCU based on the information about the coded depth and the encoding mode according to the MCUs. In other words, the image data decoder 230 may decode the encoded image data based on the extracted information about the partition type, the prediction mode, and the transformation unit for each coding unit from among the coding units having the tree structure included in each MCU. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit to perform inverse transformation based on transformation units for each coding unit, for inverse transformation for each MCU. Through the inverse transformation, a pixel value of the space domain of the coding unit may be reconstructed.

The image data decoder 230 may determine a coded depth of a current MCU by using split information according to depths. If the split information indicates that image data is no longer split in the current depth, the current depth is a coded depth. Accordingly, the image data decoder 230 may decode encoded data in the current MCU by using the information about the partition type of the prediction unit, the prediction mode, and the size of the transformation unit for each coding unit corresponding to the coded depth.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

Also, the video decoding apparatus 200 of FIG. 9 may perform operation of the SAO decoding apparatus 20 described above with reference to FIG. 2A.

The image data and encoding information extractor 220 and the receiver 210 may perform operations of the SAO context decoder 24 and the SAO bypass decoder 26 of the SAO decoding apparatus 20. The image data decoder 230 may perform operation of the SAO operator 28 of the SAO decoding apparatus 20.

The image data and encoding information extractor 220 may obtain a bitstream of SAO parameters from a bitstream of an MCU, may perform entropy decoding on the bitstream, and thus may reconstruct symbols of the SAO parameters.

Leftward SAO merge information and upward SAO merge information may be obtain, and context decoding may be performed on each of the leftward SAO merge information and the upward SAO merge information. The image data and encoding information extractor 220 may obtain one bit of SAO on/off information with respect to each of luma and chroma components. The image data and encoding information extractor 220 may perform context decoding on luma SAO on/off information and chroma SAO on/off information.

If the SAO on/off information indicates to perform SAO operation, image data and encoding information extractor 220 may obtain edge band identification information with respect to each of luma and chroma components and may perform bypass decoding on one bit of the edge band identification information.

If the SAO on/off information indicates to perform SAO operation, the image data and encoding information extractor 220 may obtain absolute offset value information with respect to each of luma, and first and second chroma components and each SAO category, and may perform bypass decoding on the absolute offset value information. With respect to a band type, the image data and encoding information extractor 220 may obtain offset sign information and band position information with respect to each of luma, and first and second chroma components, and may perform bypass decoding on each parameter. With respect to an edge type, the image data and encoding information extractor 220 may perform bypass decoding edge class information obtained with respect to each of luma and chroma components.

The edge class information for the first chroma component may also be applied to the second chroma component, and the SAO on/off information and the edge band identification information for the first chroma component may also be applied to the second chroma component.

The image data decoder 230 may generate a reconstructed pixel capable of minimizing an error between an original pixel and the reconstructed pixel, by adjusting a pixel value of the reconstructed pixel by a corresponding offset value. Offsets of reconstructed pixels of each MCU may be adjusted based on the parsed SAO parameters.

Thus, the video decoding apparatus 200 may obtain information about at least one coding unit that generates the minimum encoding error when encoding is recursively performed for each MCU, and may use the information to decode the current picture. In other words, the coding units having the tree structure determined to be the optimum coding units in each MCU may be decoded.

Accordingly, even if image data has high resolution and a large amount of data, the image data may be efficiently decoded and reconstructed by using a size of a coding unit and an encoding mode, which are adaptively determined according to characteristics of the image data, by using information about an optimum encoding mode received from an encoder.

Figure 10:
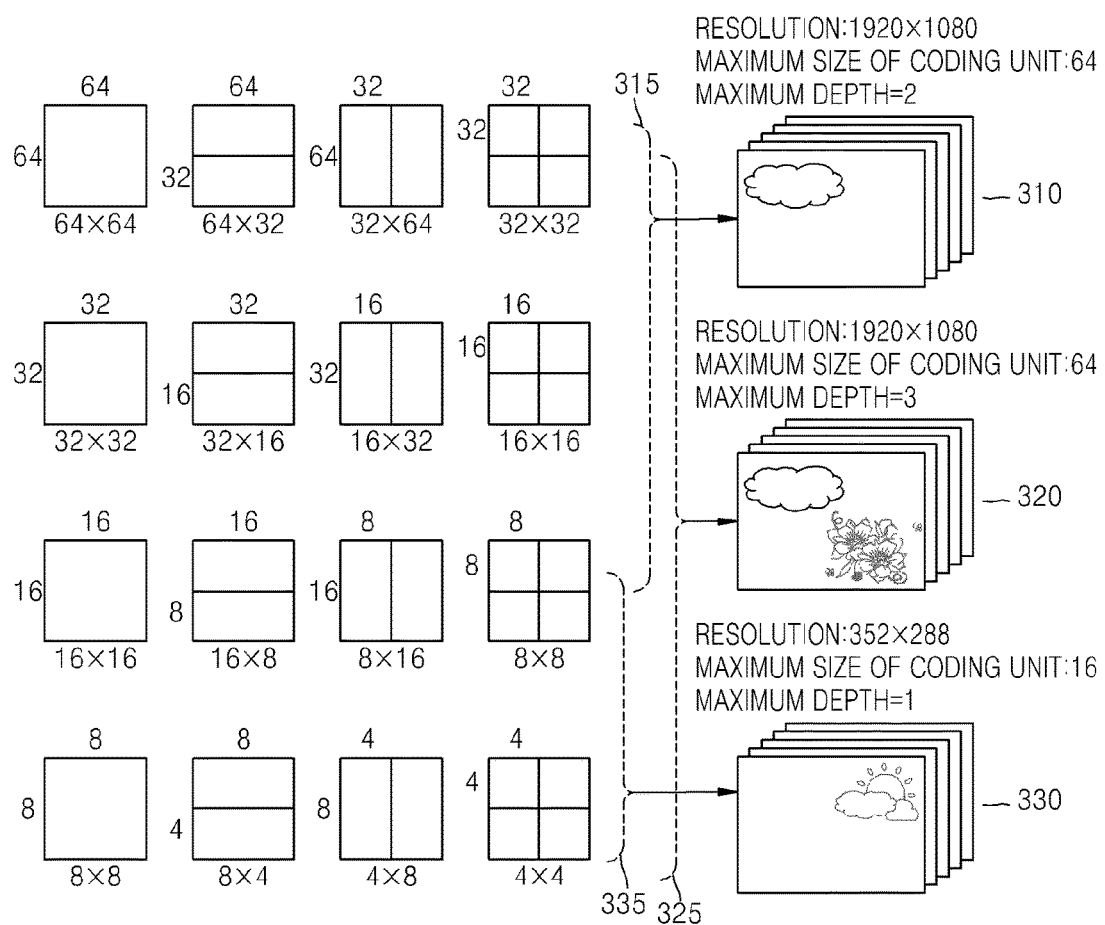
FIG. 10 illustrates a diagram for describing a concept of coding units according to exemplary embodiments of the present disclosure.

FIG. 10 illustrates a diagram for describing a concept of coding units according to exemplary embodiments of the present disclosure.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a MCU to a minimum decoding unit.

If a resolution is high or a data amount is large, a maximum size of a coding unit may be large to not only increase encoding efficiency but also to accurately reflect characteristics of an image. Accordingly, the maximum size of the coding unit of the video data 310 and 320 having a higher resolution than the video data 330 may be 64.

Because the maximum depth of the video data 310 is 2, coding units 315 of the vide data 310 may include a MCU having a long axis size of 64, and coding units having long axis sizes of 32 and 16 because depths are deepened to two layers by splitting the MCU twice. Because the maximum depth of the video data 330 is 1, coding units 335 of the video data 330 may include a MCU having a long axis size of 16, and coding units having a long axis size of 8 because depths are deepened to one layer by splitting the MCU once.

Because the maximum depth of the video data 320 is 3, coding units 325 of the video data 320 may include a MCU having a long axis size of 64, and coding units having long axis sizes of 32, 16, and 8 because the depths are deepened to 3 layers by splitting the MCU three times. As a depth deepens, detailed information may be precisely expressed.

Figure 11:
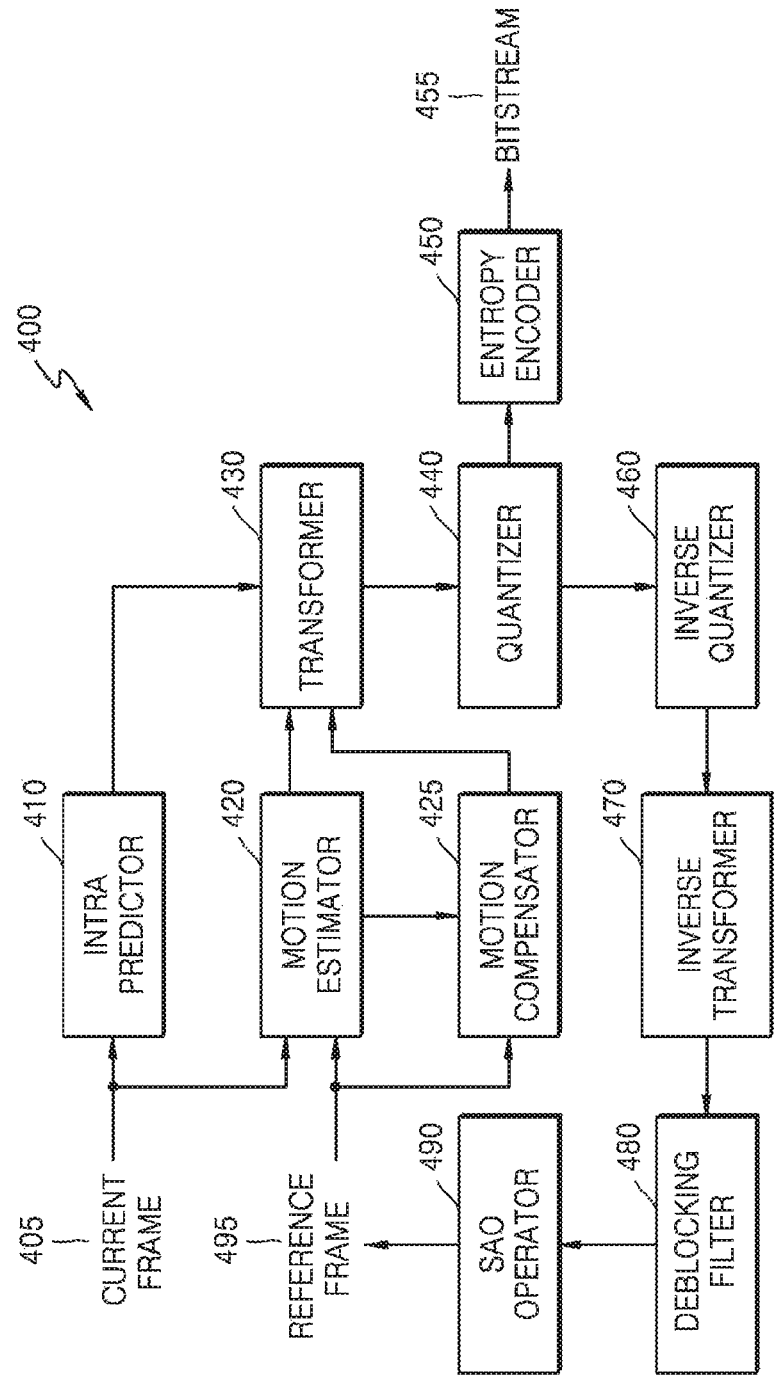
FIG. 11 illustrates a block diagram of an image encoder based on coding units, according to exemplary embodiments of the present disclosure.

FIG. 11 illustrates a block diagram of an image encoder 400 based on coding units, according to exemplary embodiments of the present disclosure.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 respectively perform motion estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is reconstructed as data in the space domain through an inverse quantizer 460 and an inverse transformer 470, and the reconstructed data in the space domain is output as the reference frame 495 after being post-processed through a deblocking filter 480 and an SAO operator 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking filter 480, and the SAO operator 490 perform operations based on each coding unit among coding units having a tree structure while considering the maximum depth of each MCU.

In particular, the intra predictor 410, the motion estimator 420, and the motion compensator 425 determine partitions and a prediction mode of each coding unit from among the coding units having a tree structure while considering the maximum size and the maximum depth of a current MCU, and the transformer 430 determines the size of the transformation unit in each coding unit from among the coding units having a tree structure.

The SAO operator 490 may classify pixels according to an edge type (or a band type) of each MCU of the reference frame 495, may determine an edge direction (or a start band position), and may determine an average error value of reconstructed pixels included in each category. With respect to each MCU, SAO merge information, an SAO type, and offset values may be encoded and signaled.

The entropy encoder 450 may perform CABAC encoding on SAO parameters including SAO merge information, SAO type information, and offset values for SAO operation. For example, for the SAO type information, one context model may be used for only a first bit and bypass-mode CABAC encoding may be performed on remaining bits. Two context models may be used for the offset values, and one context model may be used for each of left SAO merge information and upper SAO merge information. Accordingly, a total of five context models may be used to perform CABAC encoding on the SAO parameters.

Figure 12:
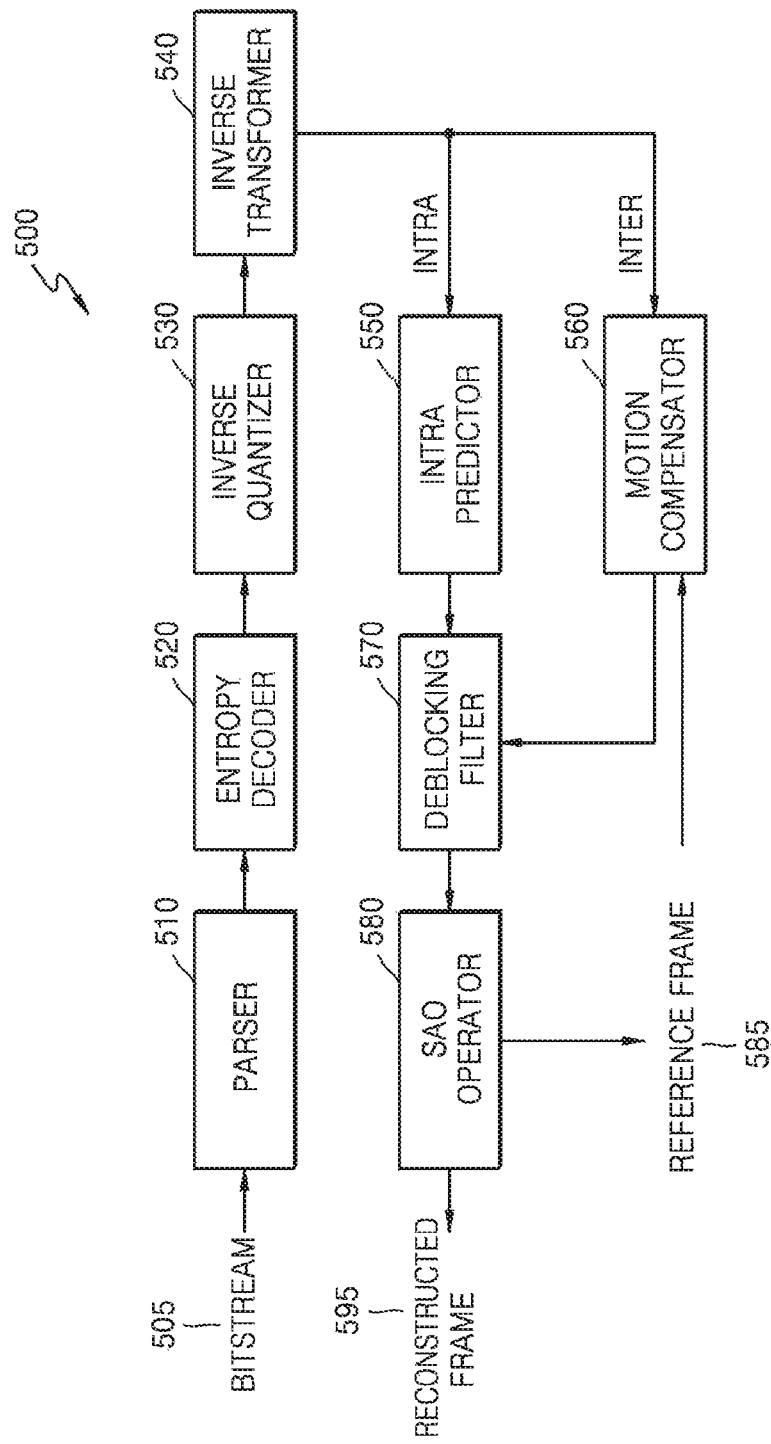
FIG. 12 illustrates a block diagram of an image decoder based on coding units, according to exemplary embodiments of the present disclosure.

FIG. 12 illustrates a block diagram of an image decoder 500 based on coding units, according to exemplary embodiments of the present disclosure.

A parser 510 parses encoded image data to be decoded and information about encoding required for decoding from a bitstream 505. The encoded image data is output as inverse quantized data through an entropy decoder 520 and an inverse quantizer 530, and the inverse quantized data is reconstructed to image data in the space domain through an inverse transformer 540.

An intra predictor 550 performs intra prediction on coding units in an intra mode with respect to the image data in the space domain, and a motion compensator 560 performs motion compensation on coding units in an inter mode by using a reference frame 585.

The image data in the space domain, which passed through the intra predictor 550 and the motion compensator 560, may be output as a reconstructed frame 595 after being post-processed through a deblocking filter 570 and an SAO operator 580. Also, the image data that is post-processed through the deblocking filter 570 and the SAO operator 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking filter 570, and the SAO operator 580 perform operations based on coding units having a tree structure for each MCU.

In particular, the intra prediction 550 and the motion compensator 560 perform operations based on partitions and a prediction mode for each of the coding units having a tree structure, and the inverse transformer 540 perform operations based on a size of a transformation unit for each coding unit.

The entropy decoder 520 may perform CABAC decoding on SAO parameters to parse SAO merge information, SAO type information, and offset values for SAO operation from the SAO parameters. For example, for the SAO type information, one context model may be used for only a first bit and bypass-mode CABAC decoding may be performed on remaining bits. Two context models may be used for the offset values, and one context model may be used for each of left SAO merge information and upper SAO merge information. Accordingly, a total of five context models may be used to perform CABAC decoding on the SAO parameters.

The image decoder 500 may extract SAO parameters of MCUs from a bitstream. Based on SAO merge information from among the SAO parameters of a current MCU, SAO parameters of the current MCU, which are the same as those of an adjacent MCU, may be reconstructed. By using an SAO type and offset values from among the SAO parameters of the current MCU, each of reconstructed pixels of MCUs of the reconstructed frame 595 may be adjusted by an offset value corresponding to a category according to the edge type or the band type.

Figure 13:
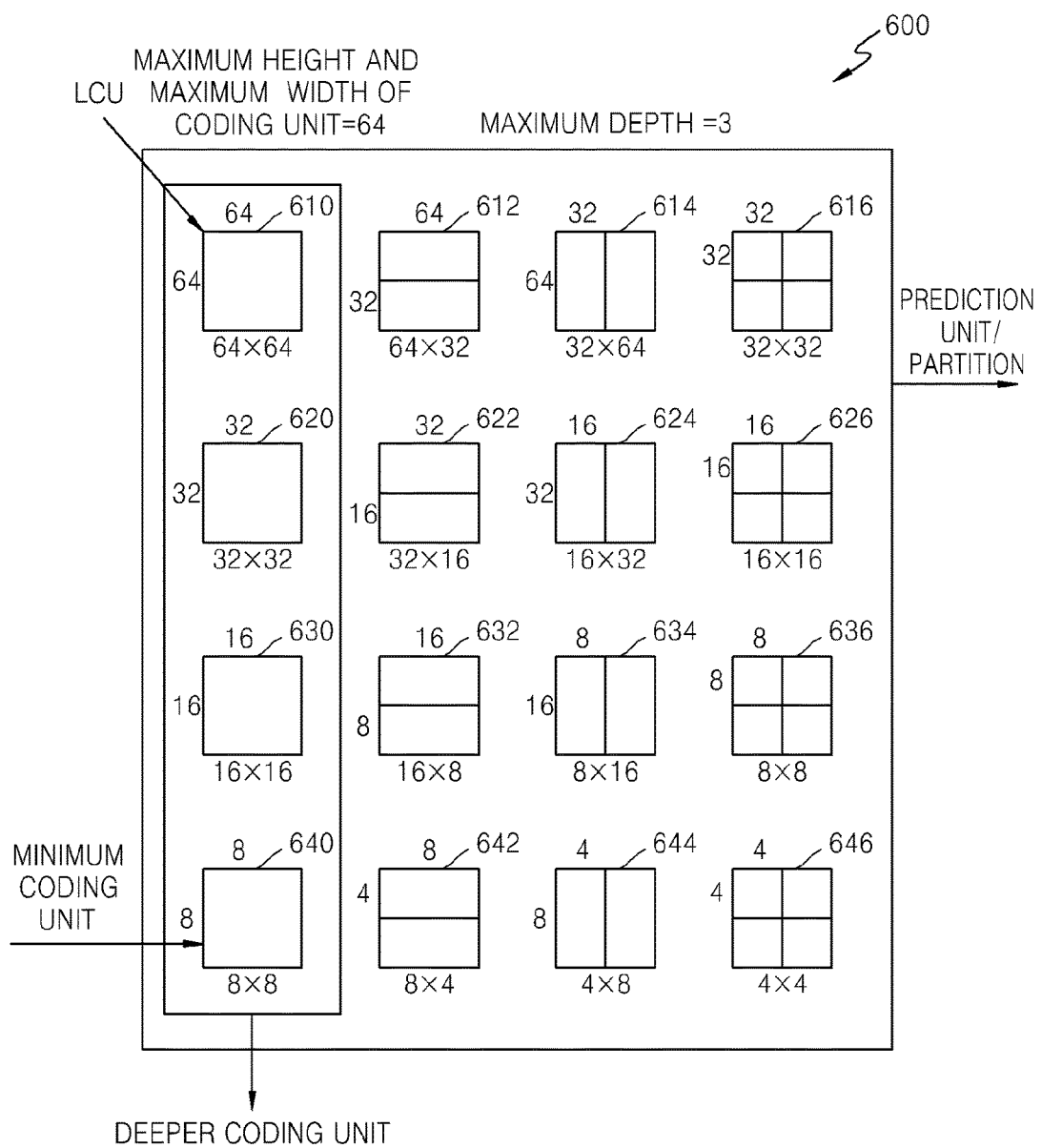
FIG. 13 illustrates a diagram illustrating deeper coding units according to depths, and partitions, according to exemplary embodiments of the present disclosure.

FIG. 13 illustrates a diagram illustrating deeper coding units according to depths, and partitions, according to exemplary embodiments of the present disclosure.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to exemplary embodiments of the present disclosure, the maximum height and the maximum width of the coding units are each 64, and the maximum depth is 4. In this case, the maximum depth refers to a total number of times the coding unit is split from the MCU to the SCU. Because a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a MCU in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 4×4 and a depth of 3 is an SCU.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the MCU 610, the coding unit determiner 120 of the video encoding apparatus 100 performs encoding for coding units corresponding to each depth included in the MCU 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a smallest encoding error may be selected for the current depth by performing encoding for each prediction unit in the coding units corresponding to the current depth, along the horizontal axis of the hierarchical structure 600. Alternatively, the minimum encoding error may be searched for by comparing the smallest encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 14 illustrates a diagram for describing a relationship between a coding unit 710 and transformation units 720, according to exemplary embodiments of the present disclosure.

The video encoding apparatus 100 or the video decoding apparatus 200 encodes or decodes an image according to coding units having sizes smaller than or equal to a MCU for each MCU. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 15 illustrates a diagram for describing encoding information of coding units corresponding to a coded depth, according to exemplary embodiments of the present disclosure.

The outputter 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 16:
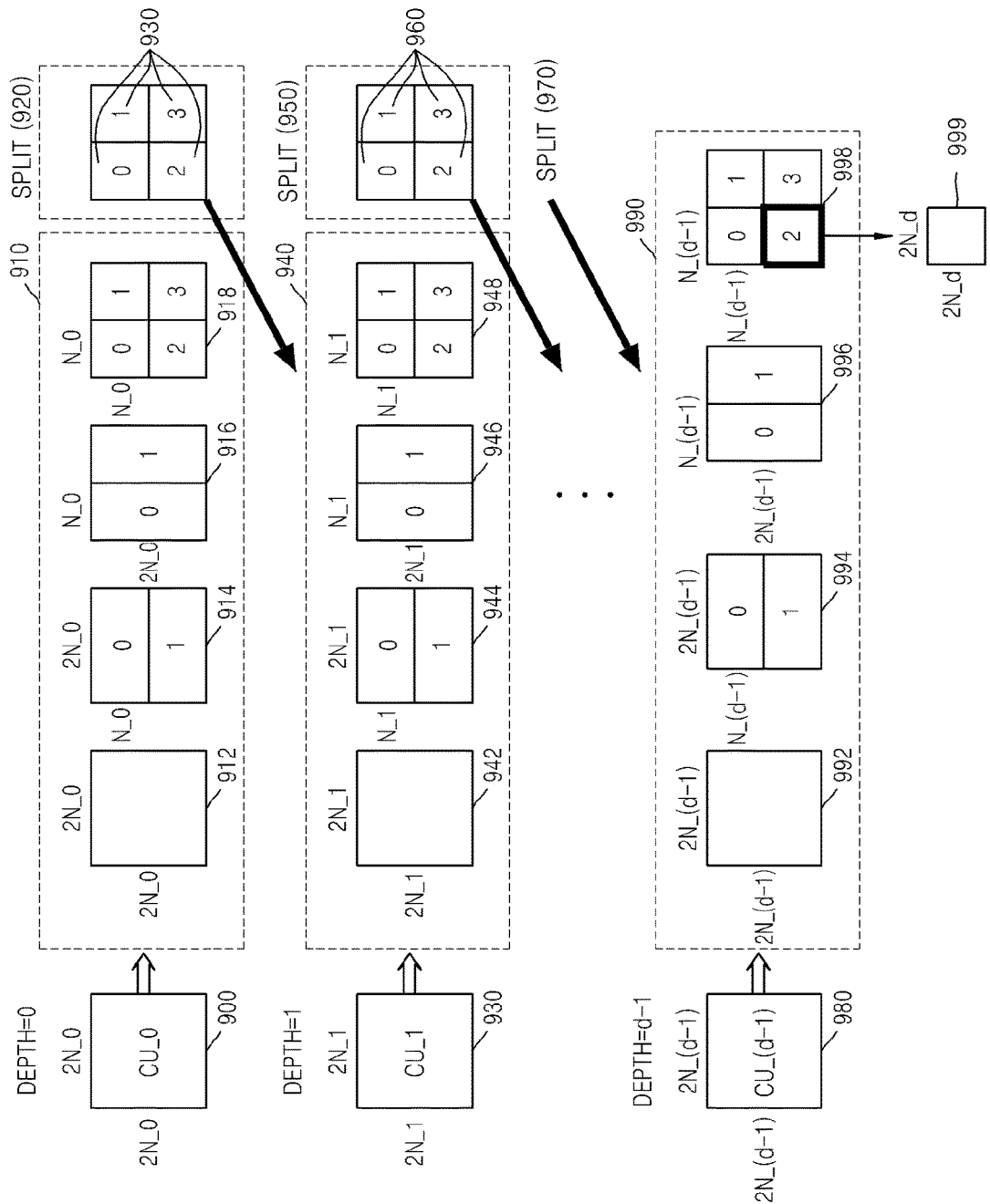
FIG. 16 illustrates a diagram of deeper coding units according to depths, according to exemplary embodiments of the present disclosure.

FIG. 16 is a diagram of deeper coding units according to depths, according to exemplary embodiments of the present disclosure.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d-1, and split information may be encoded as up to when a depth is one of 0 to d-2. In other words, when encoding is performed up to when the depth is d-1 after a coding unit corresponding to a depth of d-2 is split in operation 970, a prediction unit 990 for prediction encoding a coding unit 980 having a depth of d-1 and a size of 2N_(d-1)×2N_(d-1) may include partitions of a partition type 992 having a size of 2N_(d-1)×2N_(d-1), a partition type 994 having a size of 2N_(d-1)×N_(d-1), a partition type 996 having a size of N_(d-1)×2N_(d-1), and a partition type 998 having a size of N_(d-1)×N_(d-1).

Prediction encoding may be repeatedly performed on one partition having a size of 2N_(d-1)×2N_(d-1), two partitions having a size of 2N_(d-1)×N_(d-1), two partitions having a size of N_(d-1)×2N_(d-1), four partitions having a size of N_(d-1)×N_(d-1) from among the partition types 992 through 998 to search for a partition type having a minimum encoding error.

Even when the partition type 998 has the minimum encoding error, because a maximum depth is d, a coding unit CU_(d-1) having a depth of d-1 is no longer split to a lower depth, and a coded depth for the coding units constituting a current MCU 900 is determined to be d-1 and a partition type of the current MCU 900 may be determined to be N_(d-1)×N_(d-1). Also, because the maximum depth is d and an SCU 980 having a lowermost depth of d-1 is no longer split to a lower depth, split information of the SCU 980 is not set.

A data unit 999 may be a 'minimum unit' for the current MCU. A minimum unit according to exemplary embodiments of the present disclosure may be a square data unit obtained by splitting an SCU 980 by 4. By performing the encoding repeatedly, the video encoding apparatus 100 may select a depth having the smallest encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the smallest encoding error may be determined as a coded depth. The coded depth, the partition type of the prediction unit, and the prediction mode may be encoded and transmitted as information about an encoding mode. Also, because a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 17:
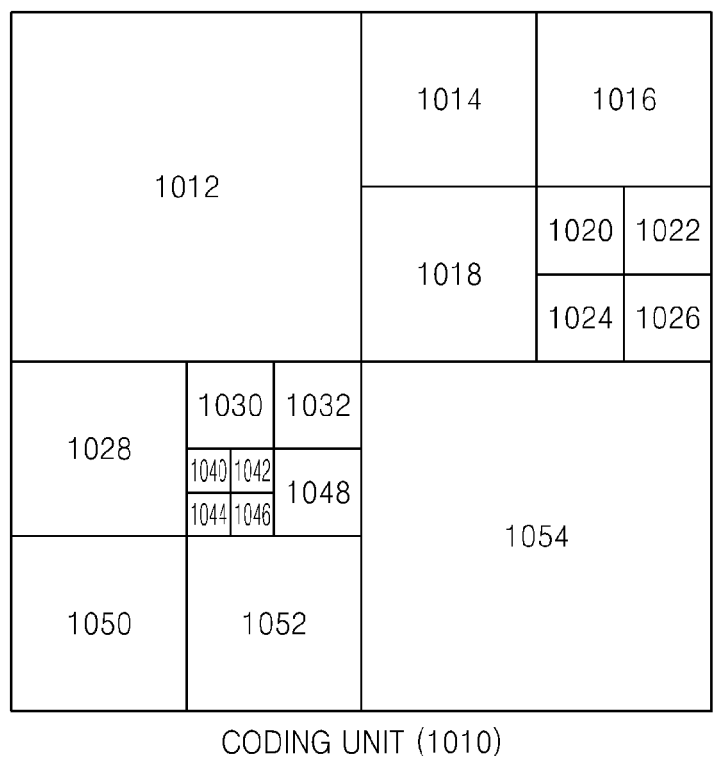
FIGS. 17 through 19 respectively illustrate diagrams for describing a relationship between coding units, prediction units, and transformation units, according to exemplary embodiments of the present disclosure.
Figure 18:
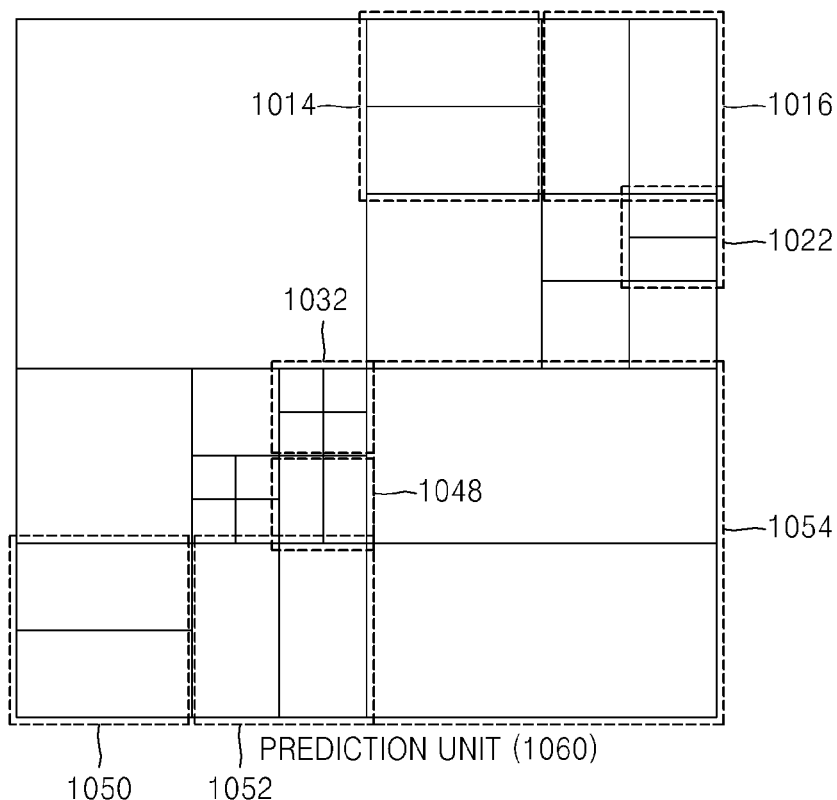
Figure 19:
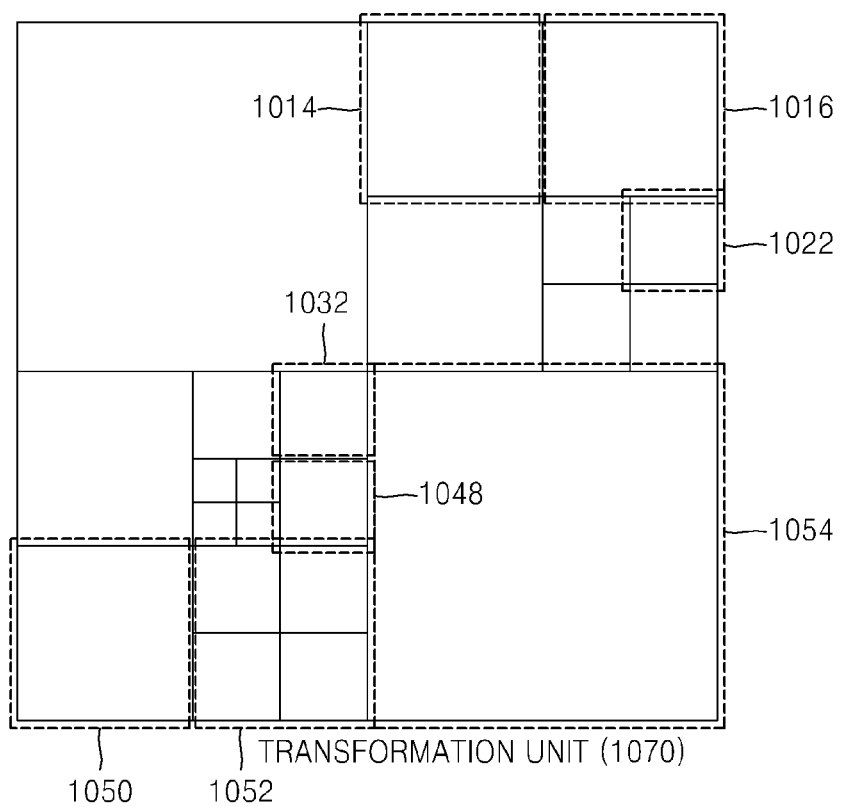

FIGS. 17 through 19 illustrate diagrams for describing a relationship between coding units 1010, prediction units 1060, and transformation units 1070, according to exemplary embodiments of the present disclosure.

The coding units 1010 are coding units having a tree structure, corresponding to coded depths determined by the video encoding apparatus 100, in a MCU. The prediction units 1060 are partitions of prediction units of each of the coding units 1010, and the transformation units 1070 are transformation units of each of the coding units 1010.

When a depth of a MCU is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a MCU to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

The outputter 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit

TABLE 1

Split Information 0
(Encoding on Coding Unit having Size of 2N × 2N and Current Depth of d)

| | | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 | corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a MCU may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
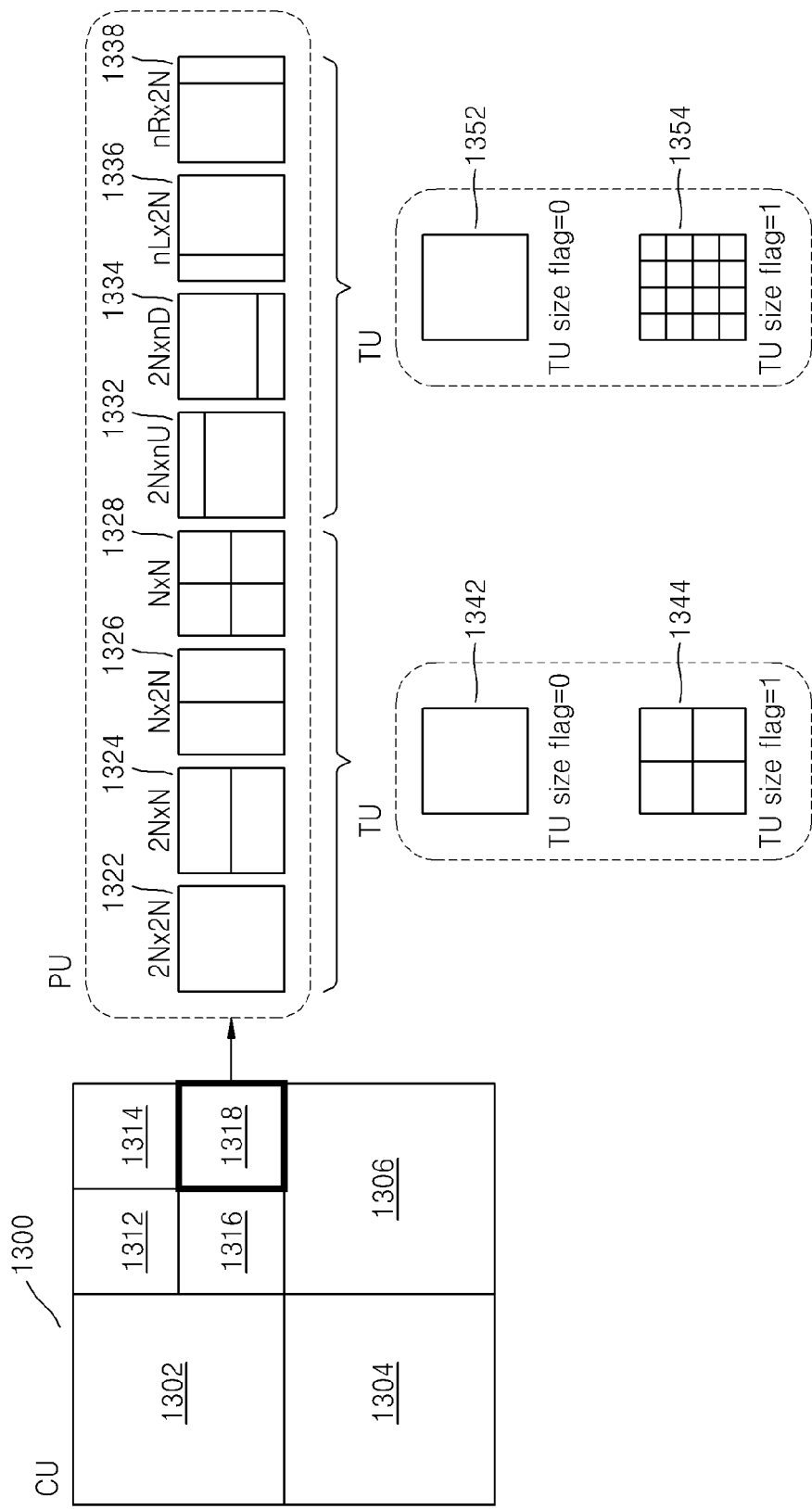
FIG. 20 illustrates a diagram for describing a relationship between a coding unit, a prediction unit, and a transformation unit, according to encoding mode information.

FIG. 20 illustrates a diagram for describing a relationship between a coding unit, a prediction unit, and a transformation unit, according to encoding mode information of Table 1.

A MCU 1300 includes coding units (CUs) 1302, 1304, 1306, 1312, 1314, 1316, and 1318 of coded depths. Here, because the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 20, the TU size flag is a flag having a value or 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to exemplary embodiments according to the present disclosure, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, because the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to exemplary embodiments according to the present disclosure, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

In other words, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad (3)$$

In other words, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the present disclosure is not limited thereto.

According to the video encoding method based on coding units having a tree structure as described with reference to FIGS. 8 through 20, image data of the space domain is encoded for each coding unit of a tree structure. According to the video decoding method based on coding units having a tree structure, decoding is performed for each MCU to reconstruct image data of the space domain. Thus, a picture and a video that is a picture sequence may be reconstructed. The reconstructed video may be reproduced by a reproducing apparatus, stored in a storage medium, or transmitted through a network.

Also, SAO parameters may be signaled with respect to each picture, each slice, each MCU, each of coding units having a tree structure, each prediction unit of the coding units, or each transformation unit of the coding units. For example, pixel values of reconstructed pixels of each MCU may be adjusted by using offset values reconstructed based on received SAO parameters, and thus an MCU having a minimized error between an original block and the MCU may be reconstructed.

For convenience of description, the video encoding method according to operation of a sample offset, which is described above with reference to FIGS. 1A through 20, will be referred to as a 'video encoding method according to the present disclosure'. In addition, the video decoding method according to operation of a sample offset, which is described above with reference to FIGS. 1A through 20, will be referred to as a 'video decoding method according to the present disclosure'.

Also, a video encoding apparatus including the SAO encoding apparatus 10, the video encoding apparatus 100, or the image encoder 400, which is described above with reference to FIGS. 1A through 20, will be referred to as a 'video encoding apparatus according to the present disclosure'. In addition, a video decoding apparatus including the video decoding apparatus 20, the video decoding apparatus 200, or the image decoder 500, which is described above with reference to FIGS. 1A through 20, will be referred to as a 'video decoding apparatus according to the present disclosure'.

A computer-readable recording medium storing a program, e.g., a disc 26000, according to exemplary embodiments of the present disclosure will now be described in detail.

Figure 21:
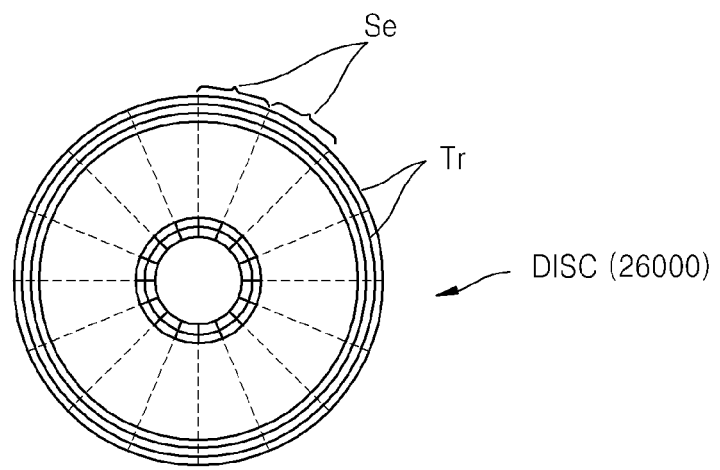
FIG. 21 illustrates a diagram of a physical structure of a disc in which a program is stored, according to exemplary embodiments of the present disclosure.

FIG. 21 illustrates a diagram of a physical structure of the disc 26000 in which a program is stored, according to exemplary embodiments of the present disclosure. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantization parameter determination method, the video encoding method, and the video decoding method described above may be assigned and stored.

A computer system embodied using a storage medium that stores a program for executing the video encoding method and the video decoding method as described above will now be described with reference to FIG. 22.

Figure 22:
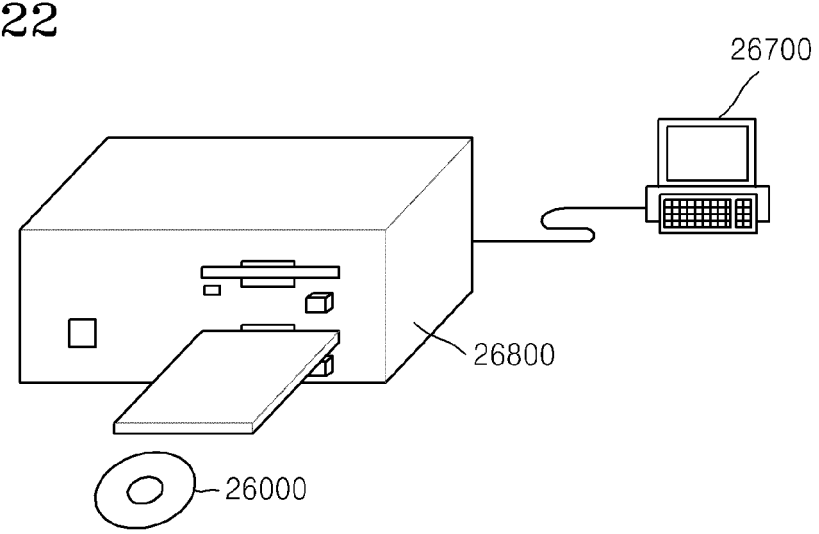
FIG. 22 illustrates a diagram of a disc drive for recording and reading a program by using a disc.

FIG. 22 illustrates a diagram of a disc drive 26800 for recording and reading a program by using the disc 26000. A computer system 26700 may store a program that executes at least one of a video encoding method and a video decoding method according to exemplary embodiments of the present disclosure, in the disc 26000 via the disc drive 26800. To run the program stored in the disc 26000 in the computer system 26700, the program may be read from the disc 26000 and be transmitted to the computer system 26700 by using the disc drive 26700.

The program that executes at least one of a video encoding method and a video decoding method according to exemplary embodiments of the present disclosure may be stored not only in the disc 26000 illustrated in FIG. 21 or 22 but also in a memory card, a ROM cassette, or a solid state drive (SSD).

A system to which the video encoding method and a video decoding method described above are applied will be described below.

Figure 23:
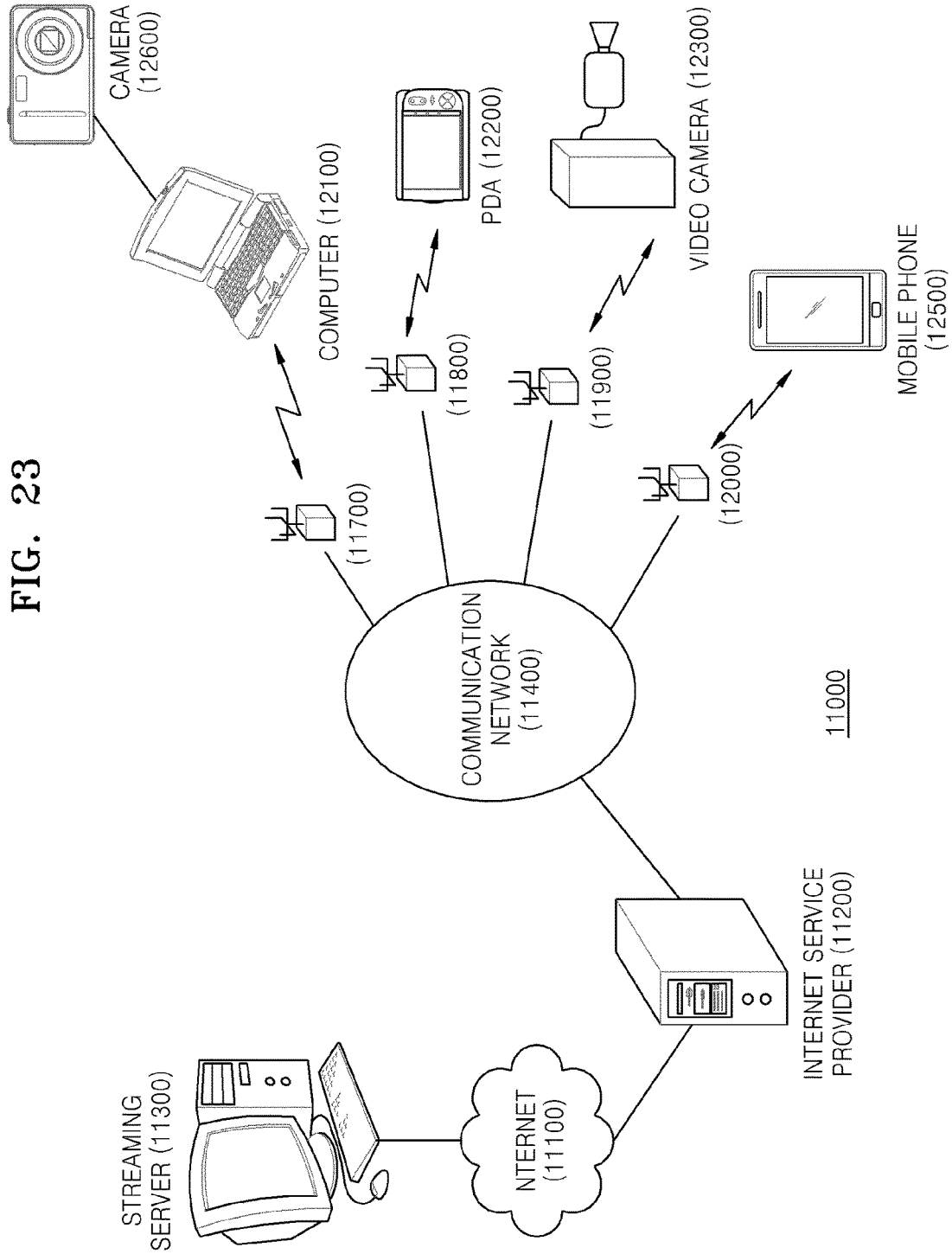
FIG. 23 illustrates a diagram of an overall structure of a content supply system for providing a content distribution service.

FIG. 23 illustrates a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
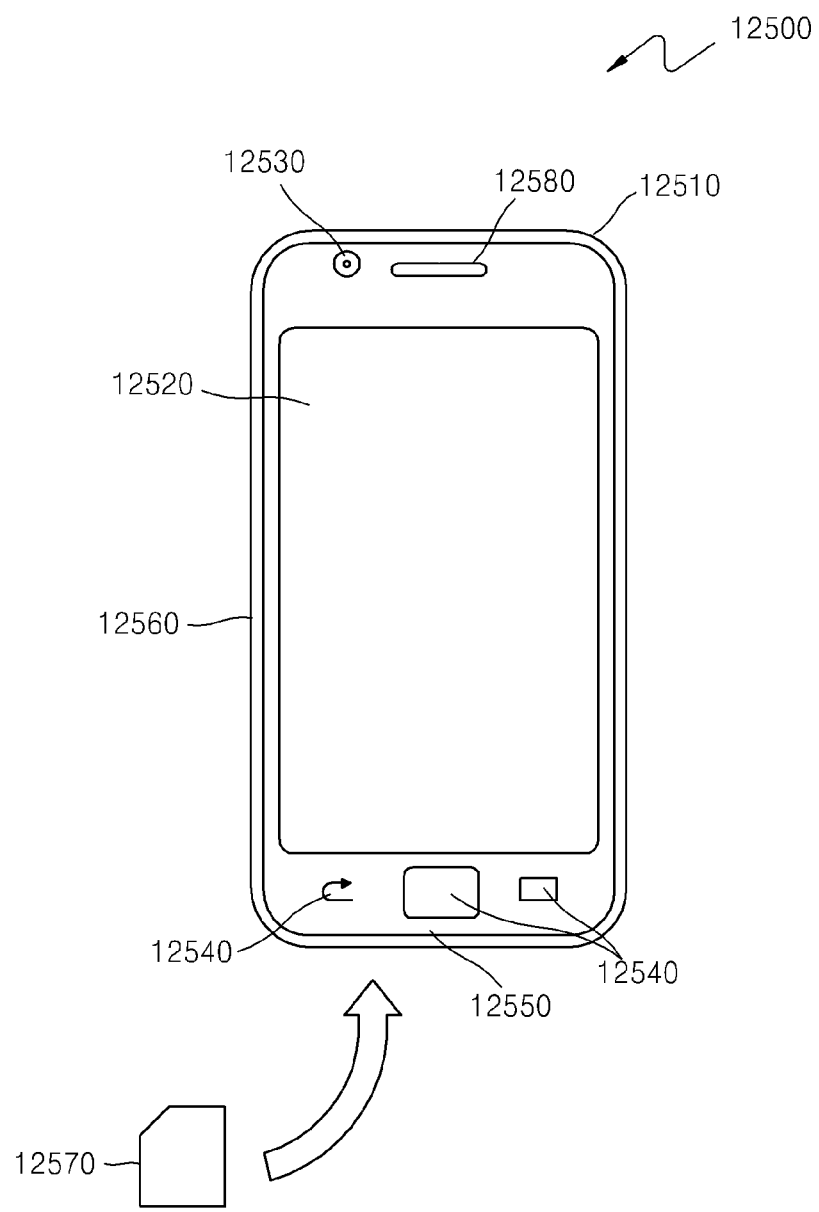
FIGS. 24 and 25 respectively illustrate diagrams of an external structure and an internal structure of a mobile phone to which a video encoding method and a video decoding method may be applied, according to exemplary embodiments of the present disclosure.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer

12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to exemplary embodiments of the present disclosure.

The mobile phone 12500 included in the content supply system 11000 according to exemplary embodiments of the present disclosure will now be described in greater detail with referring to FIGS. 24 and 25.

FIG. 24 illustrates an external structure of the mobile phone 12500 to which a video encoding method and a video decoding method are applied, according to exemplary embodiments of the present disclosure. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound outputter, and a microphone 12550 for inputting voice and sound or another type sound inputter. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
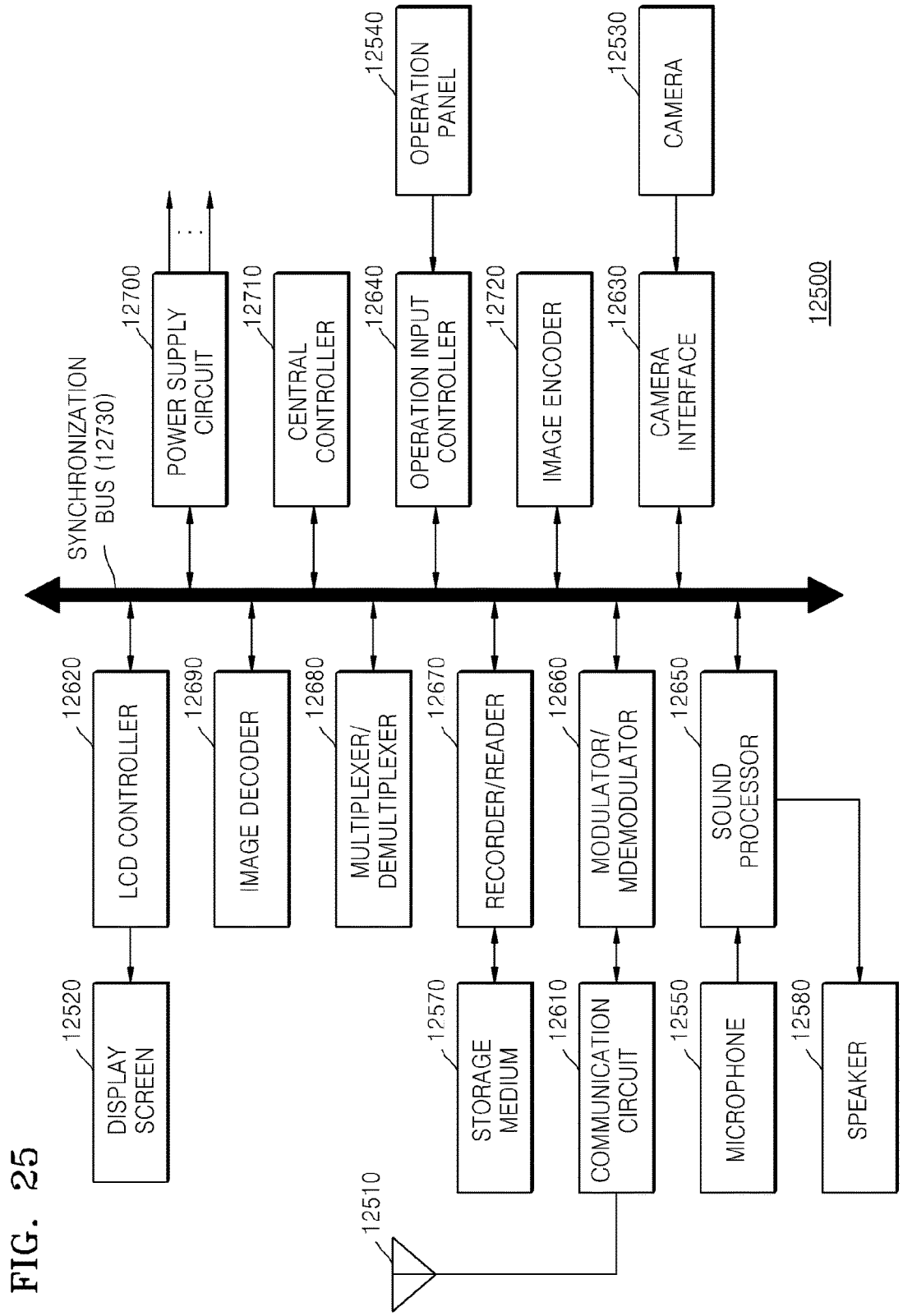

FIG. 25 illustrates an internal structure of the mobile phone 12500, according to exemplary embodiments of the present disclosure. To systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulator/demodulator 12660 under control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulator/demodulator 12660 and the communication circuit 12610, and may be transmitted via the antenna 12510.

When a text message, e.g., email, is transmitted in a data communication mode, text data of the text message is input via the operation panel 12540 and is transmitted to the central controller 12710 via the operation input controller 12640. Under control of the central controller 12710, the text data is transformed into a transmission signal via the modulator/demodulator 12660 and the communication circuit 12610 and is transmitted to the wireless base station 12000 via the antenna 12510.

To transmit image data in the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the above-described video encoding method according to the present disclosure. The image encoder 12720 may transform the image data received from the camera 12530 into compressed and encoded image data based on the above-described video encoding method according to the present disclosure, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulator/demodulator 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulator/demodulator 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoder 12690 may correspond to that of the above-described video decoding method according to the present disclosure. The image decoder 12690 may decode the encoded video data to obtain reconstructed video data and provide the reconstructed video data to the display screen 12520 via the LCD controller 12620, by using the above-described video decoding method according to the present disclosure.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to exemplary embodiments of the present disclosure, may be a transceiving terminal including only the video encoding apparatus, or may be a transceiving terminal including only the video decoding apparatus.

Figure 26:
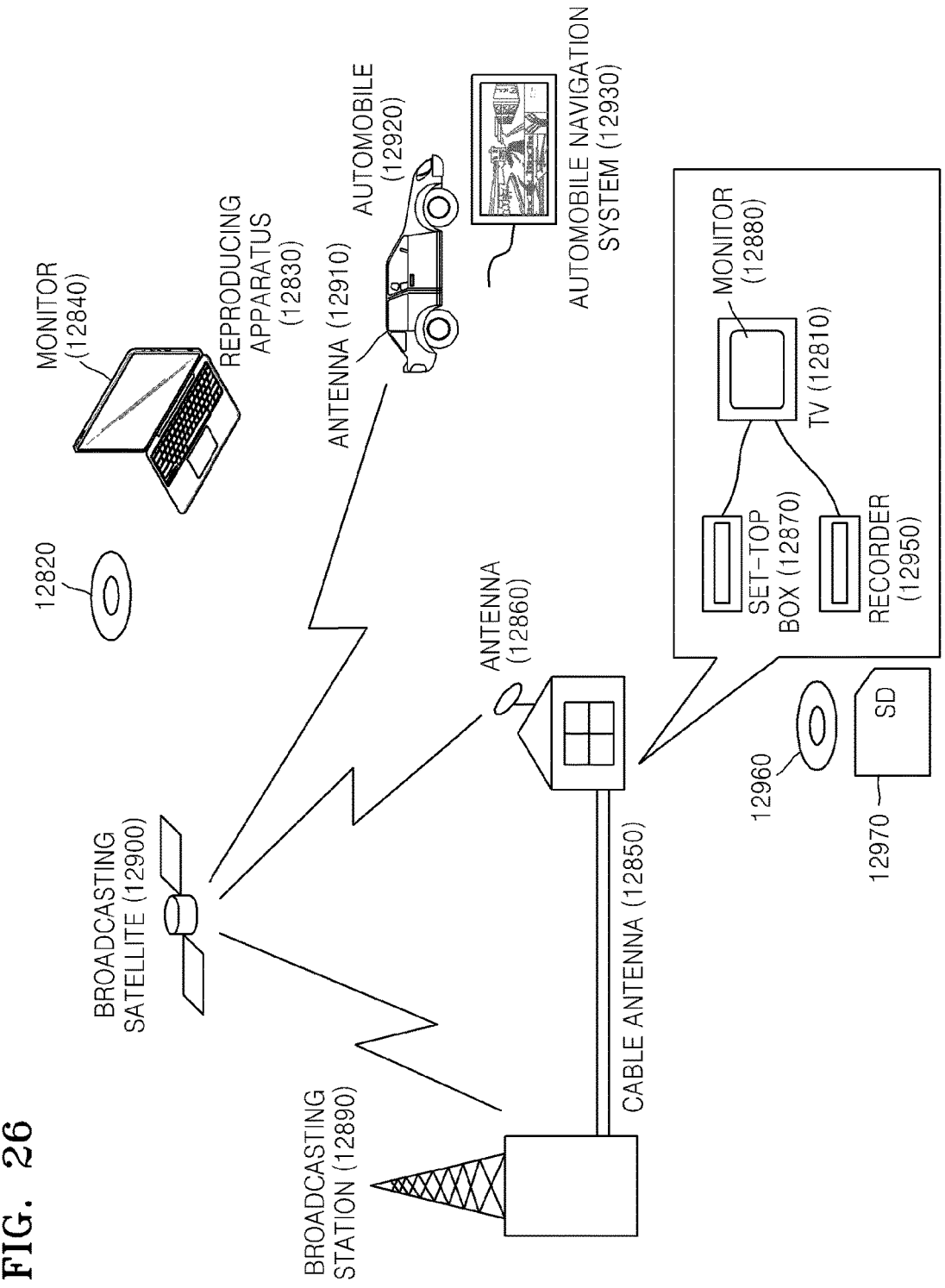
FIG. 26 illustrates a diagram of a digital broadcast system to which a communication system is applied, according to exemplary embodiments of the present disclosure.

A communication system according to the present disclosure is not limited to the communication system described above with reference to FIG. 24. For example, FIG. 26 illustrates a digital broadcasting system employing a communication system, according to exemplary embodiments of the present disclosure. The digital broadcasting system of FIG. 26 may receive a digital broadcast transmitted via a satellite or a terrestrial network by using a video encoding apparatus and a video decoding apparatus according to exemplary embodiments of the present disclosure.

In particular, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to exemplary embodiments of the present disclosure is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to exemplary embodiments of the present disclosure may be installed. Data output from the set-top box 12870 may also be reproduced on a TV monitor 12880.

As another example, a video decoding apparatus according to exemplary embodiments of the present disclosure may be installed in the TV receiver 12810 instead of the set-top box 12870.

An automobile 12920 that has an appropriate antenna 12910 may receive a signal transmitted from the satellite 12900 or the wireless base station 11700 of FIG. 21. A decoded video may be reproduced on a display screen of an automobile navigation system 12930 installed in the automobile 12920.

A video signal may be encoded by a video encoding apparatus according to exemplary embodiments of the present disclosure and may then be stored in a storage medium. In particular, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to exemplary embodiments of the present disclosure, a video signal recorded on the DVD disc 12960, the SD card 12970, or another storage medium may be reproduced on the TV monitor 12880.

The automobile navigation system 12930 may not include the camera 12530 of FIG. 24, and the camera interface 12630 and the image encoder 12720 of FIG. 25. For example, the computer 12100 and the TV receiver 12810 may not include the camera 12530, the camera interface 12630, and the image encoder 12720.

Figure 27:
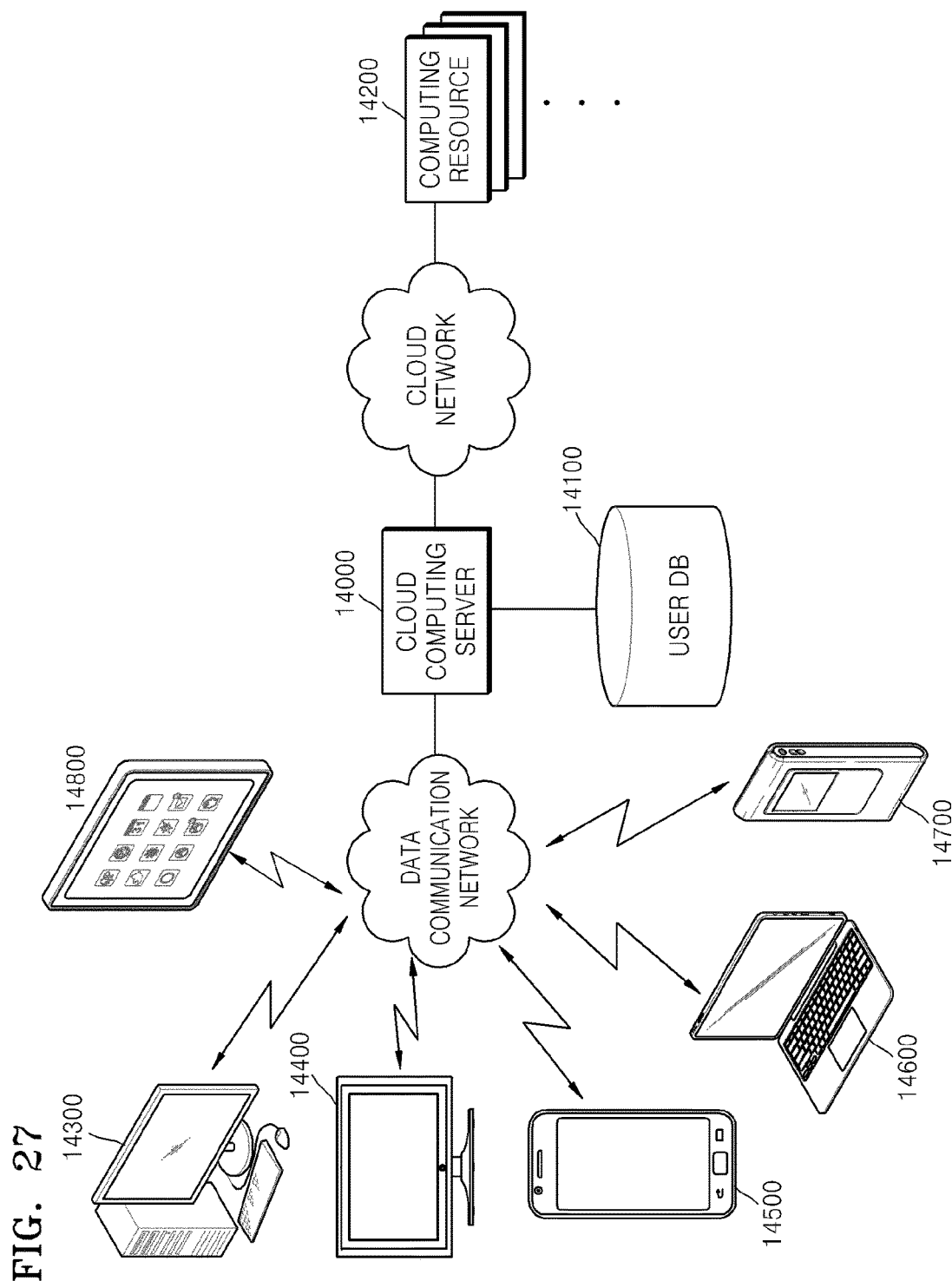
FIG. 27 illustrates a diagram illustrating a network structure of a cloud computing system using a video encoding apparatus and a video decoding apparatus, according to exemplary embodiments of the present disclosure.

FIG. 27 illustrates a diagram illustrating a network structure of a cloud computing system using a video encoding apparatus and a video decoding apparatus, according to exemplary embodiments of the present disclosure.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus as described above with reference to FIGS. 1A through 20. As another example, the user terminal may include a video encoding apparatus as described above with reference to FIGS. 1A through 20. Alternatively, the user terminal may include both the video decoding apparatus and the video encoding apparatus as described above with reference to FIGS. 1A through 20.

Various applications of a video encoding method, a video decoding method, a video encoding apparatus, and a video decoding apparatus according to exemplary embodiments of the present disclosure described above with reference to FIGS. 1A through 20 have been described above with reference to FIGS. 21 to 27. However, methods of storing the video encoding method and the video decoding method in a storage medium or methods of implementing the video encoding apparatus and the video decoding apparatus in a device, according to various exemplary embodiments of the present disclosure, are not limited to the exemplary embodiments described above with reference to FIGS. 21 to 27.

In the present specification, an expression "A may include one of a1, a2, and a3" broadly means that an exemplary sub element of the element A is a1, a2, or a3.

The above expression does not limit a sub element of the element A to a1, a2, or a3. Therefore, it should be noted that the above expression should not be construed to exclude elements other than a1, a2, and a3 from sub elements of the element A.

Also, the above expression means that the element A may include a1, may include a2, or may include a3. The above expression does not mean that sub elements of the element A are selectively determined in a certain group. For example, it should be noted that the above expression should not be construed as that a1, a2, or a3 selected from the group consisting of a1, a2, and a3 forms the element A.

Furthermore, in the present specification, an expression "at least one of a1, a2, and a3" denotes one of a1; a2; a3; a1 and a2; a1 and a3; a2 and a3; and a1, a2, and a3.

Therefore, it should be noted that, unless defined as "at least one of a1, at least one of a2, or (and) at least one of a3", the expression "at least one of a1, a2, and a3" is not construed as "at least one of a1, at least one of a2, or (and) at least one of a3".

The exemplary embodiments according to the present disclosure may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

While the present disclosure has been particularly shown and described with reference to exemplary embodiments thereof, it will be understood by one of ordinary skill in the art that various changes in form and details may be made therein without departing from the spirit and scope of the disclosure as defined by the following claims. The exemplary embodiments should be considered in a descriptive sense only and not for purposes of limitation. Therefore, the scope of the disclosure is defined not by the detailed description of the disclosure but by the following claims, and all differences within the scope will be construed as being included in the present disclosure.

The invention claimed is:

1. An apparatus for a sample adaptive offset (SAO) decoding, the apparatus comprising:
   an obtainer configured to obtain context-encoded leftward SAO merge information and context-encoded upward SAO merge information from a bitstream of a maximum coding unit (MCU), obtain SAO on/off information among SAO type information of the MCU , by performing context decoding on the bitstream, and obtain absolute offset value information of the MCU by performing bypass decoding on the bitstream in response to determining that the SAO on/off information indicates to perform SAO operation; and
   a reconstructor configured to outputting a reconstructed block of the MCU by applying the absolute offset value information to reconstructed samples of the MCU,
   wherein:
   in response to determining that the SAO type information indicates a band offset type, the obtainer is configured to obtain band position information of the MCU by performing bypass decoding on the bitstream, and the reconstructor is configured to output the reconstructed block of the MCU by applying the absolute offset value information corresponding to the band position information to the reconstructed samples of the MCU,
   in response to determining that the SAO type information indicates an edge offset type, the obtainer is configured to obtain edge class information of the MCU by performing bypass decoding on the bitstream, and the reconstructor is configured to output the reconstructed block of the MCU by applying the absolute offset value information corresponding to the edge class information to the reconstructed samples of the MCU,
   the SAO type information includes first SAO type information for luma components of the MCU and second SAO type information for chroma components of the MCU, and the second SAO type information is obtained for Cr components of the MCU from the bitstream, and the second SAO type information is used for Cb components of the MCU.

2. A method of a sample adaptive offset (SAO) encoding, the method comprising:
   generating SAO type information of a maximum coding unit (MCU) including SAO on/off information generated by performing context encoding on the SAO on/off information indicating whether SAO operation is performed on the MCU;
   performing bypass encoding on absolute offset value information generated for performing SAO operation of the MCU; and
   when the SAO operation is performed on the MCU and the SAO type information is generated according to a band offset type, performing bypass encoding on band position information of the MCU, wherein the absolute offset value information corresponds to the band position information,
   when the SAO operation is performed on the MCL and the SAO type information is generated according to an edge offset type, performing bypass encoding on edge class information of the MCU, the absolute offset value information corresponds to the edge class information,
   wherein, the SAO type information includes first SAO type information for luma components of the MCU and second SAO type information for chroma components of the MCU, and the second SAO type information is generated for Cr components of the MCU from the bitstream, and the second SAO type information is encoded for Cb components of the MCU.

3. An apparatus for a sample adaptive offset (SAO) encoding, the apparatus comprising:
   a SAO parameter determiner configured to determine absolute offset value information generated for performing SAO operation of a maximum coding unit (MCU); and
   an entropy encoder configured to generate SAO type information of the MCU including SAO on/off information generated by performing context encoding on the SAO on/off information indicating whether SAO operation is performed on the MCU, and perform bypass encoding on the absolute offset value information,
   wherein, when the SAO operation is performed on the MCU and the SAO type information is generated according to a band offset type, the entropy encoder is configured to perform bypass encoding on band position information of the MCU, wherein the absolute offset value information corresponds to the band position information,
   when the SAO operation is performed on the MCU and the SAO type information is generated according to an edge offset type, the entropy encoder is configured to perform bypass encoding on edge class information of the MCU, the absolute offset value information corresponds to the edge class information,
   the SAO type information includes first SAO type information for luma components of the MCU and second SAO type information for chroma components of the MCU, and the second SAO type information is generated for Cr components of the MCU from the bitstream, and the second SAO type information is encoded for Cb components of the MCU.

4. A non-transitory computer-readable storage medium storing a bitstream, the bitstream comprising:
   SAO type information of a maximum coding unit (MCU), including SAO on/off information generated by performing context encoding, the SAO on/off information indicating whether SAO operation is performed on the MCU; and
   absolute offset value information generated, by performing bypass encoding, for performing SAO operation of the MCU,
   wherein:
   when the SAO operation is performed on the MCU and the SAO type information is generated according to a band offset type, the bitstream further includes band position information of the MCU generated by performing bypass encoding and the absolute offset value information corresponds to the band position information,
   when the SAO operation is performed on the MCU and the SAO type information is generated according to an edge offset type, the bitstream further includes edge class information of the MCU generated by performing bypass encoding and the absolute offset value information corresponds to the edge class information, wherein, the SAO type information includes first SAO type information for luma components of the MCU and second SAO type information for chroma components of the MCU, and the second SAO type information is generated for Cr components of the MCU from the bitstream, and the second SAO type information is encoded for Cb components of the MCU.

5. A non-transitory computer-readable storage medium storing a bitstream, the bitstream comprising:
- SAO type information of a maximum coding unit (MCU), including SAO on/off information generated by performing context encoding, the SAO on/off information indicating whether SAO operation is performed on the MCU; and
- absolute offset value information generated, by performing bypass encoding, for performing SAO operation of the MCU, wherein:
when the SAO operation is performed on the MCU and the SAO type information is generated according to a band offset type, the bitstream further includes band position information of the MCU generated by performing bypass encoding and the absolute offset value information corresponds to the band position information, when the SAO operation is performed on the MCU and the SAO type information is generated according to an edge offset type, the bitstream further includes edge class information of the MCU generated by performing bypass encoding and the absolute offset value information corresponds to the edge class information, wherein, the SAO type information includes first SAO type information for luma components of the MCU and second SAO type information for chroma components of the MCU, and the second SAO type information is generated for Cr components of the MCU from the bitstream, and the second SAO type information is encoded for Cb components of the MCU, the edge class information includes first edge class information for the luma components and second edge class information for the chroma components and the second edge class information is obtained for the Cr components from the bitstream, and the second edge class information is used for the Cb components.

\* \* \* \* \*